US012155983B2

(12) United States Patent
Isaacson et al.

(10) Patent No.: US 12,155,983 B2
(45) **Date of Patent: *Nov. 26, 2024**

(54) CONTAMINANT-PROOF MICROPHONE ASSEMBLY

(71) Applicant: Cochlear Limited, Macquarie University (AU)

(72) Inventors: Nathan Isaacson, Balgowlah (AU); Adam Mujaj, Redfern (AU)

(73) Assignee: Cochlear Limited, Macquarie University (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,152

(22) Filed: Jun. 27, 2023

(65) Prior Publication Data

US 2023/0345159 A1 Oct. 26, 2023

Related U.S. Application Data

(63) Continuation of application No. 17/842,408, filed on Jun. 16, 2022, now Pat. No. 11,706,551, which is a (Continued)

(51) Int. Cl.
*H04R 3/00* (2006.01)
*H04R 1/04* (2006.01)

(Continued)

(52) U.S. Cl.
CPC ............... *H04R 1/086* (2013.01); *H04R 1/04* (2013.01); *H04R 3/00* (2013.01); *H04R 19/04* (2013.01);

(Continued)

(58) Field of Classification Search
CPC . H04R 1/086; H04R 1/04; H04R 3/00; H04R 19/04; H04R 31/006; H04R 25/604; H04R 2201/003; H04R 2225/67

(Continued)

(56) References Cited

U.S. PATENT DOCUMENTS 6,018,585 A 1/2000 Akino et al.
6,505,076 B2 1/2003 Tziviskos (Continued)

FOREIGN PATENT DOCUMENTS

CN 102859688 A 1/2013
CN 204993857 U 1/2016

(Continued)

OTHER PUBLICATIONS

International Search Report and Written Opinion received in international application No. PCT/IB2019/056071, dated Jan. 21, 2020 (16 pages).

(Continued)

*Primary Examiner* — Ammar T Hamid
(74) *Attorney, Agent, or Firm* — Edell, Shapiro & Finnan, LLC

(57) ABSTRACT

Presented herein are contaminant-proof microphone assemblies for use with devices/apparatuses, such as auditory prostheses, that include one or more microphones disposed within a housing. A contaminant-proof microphone assembly in accordance with certain embodiments presented herein includes a microphone, a microphone plug, and a contaminant-proof membrane. The microphone plug has a first end coupled to the microphone and a second end that is configured to be positioned adjacent the contaminant-proof membrane. As such, the microphone plug is disposed between a sound inlet of the microphone and the contaminant-proof membrane. The microphone plug may be configured to mate with the housing or a gasket attached to the housing.

20 Claims, 19 Drawing Sheets

Related U.S. Application Data continuation of application No. 16/973,219, filed as application No. PCT/IB2019/056071 on Jul. 16, 2019, now Pat. No. 11,395,058.

(60) Provisional application No. 62/700,406, filed on Jul. 19, 2018.

(51) Int. Cl.

| | |
|---|---|
| ***H04R 1/08*** | (2006.01) |
| ***H04R 19/04*** | (2006.01) |
| ***H04R 31/00*** | (2006.01) |
| *H04R 25/00* | (2006.01) |

(52) U.S. Cl.

CPC ......... *H04R 31/006* (2013.01); *H04R 25/604* (2013.01); *H04R 2201/003* (2013.01); *H04R 2225/67* (2013.01)

(58) Field of Classification Search

USPC .................................................. 381/113, 111

See application file for complete search history.

(56) References Cited

U.S. PATENT DOCUMENTS

| | | | |
|---|---|---|---|
| 7,627,132 | B2 | 12/2009 | Anderson |
| 8,150,082 | B2 | 4/2012 | Saito |
| 8,873,783 | B2 | 10/2014 | Koester |
| 9,084,053 | B2 | 7/2015 | Parkins |
| 9,132,270 | B2 | 9/2015 | Vaishya |
| 9,344,818 | B2 | 5/2016 | Cho |
| 9,460,732 | B2 | 10/2016 | Wingate et al. |
| 9,636,259 | B2 | 5/2017 | Henry |
| 9,843,659 | B2 | 12/2017 | Yamaguchi |
| 10,021,478 | B2 | 7/2018 | Wurtz et al. |
| 10,057,697 | B2 | 8/2018 | Larssen et al. |
| 10,334,370 | B2 | 6/2019 | Herscher et al. |
| 10,375,491 | B2 | 8/2019 | Larssen et al. |
| 10,506,353 | B2 | 12/2019 | Wichmann et al. |
| 10,623,873 | B2 | 4/2020 | Flaig et al. |
| 10,820,126 | B2 | 10/2020 | Wichmann et al. |
| 11,044,565 | B2 | 6/2021 | Wichmann et al. |
| 11,128,964 | B2 | 9/2021 | Weibel et al. |
| 11,178,497 | B2 | 11/2021 | Bottoni et al. |
| 11,184,718 | B2 | 11/2021 | Voss et al. |
| 11,395,058 | B2 | 7/2022 | Isaacson et al. |
| 2007/0003087 | A1 | 1/2007 | Ram |
| 2008/0165996 | A1 | 7/2008 | Saito |
| 2011/0013799 | A1 | 1/2011 | Fang |
| 2011/0170728 | A1 | 7/2011 | Chen |
| 2011/0280426 | A1 | 11/2011 | Bachler |
| 2014/0064546 | A1 | 3/2014 | Szczech et al. |
| 2015/0271610 | A1 | 9/2015 | Vandyke |
| 2015/0382118 | A1 | 12/2015 | Vaishya |
| 2016/0234594 | A1 | 8/2016 | Ogura |
| 2016/0378142 | A1 | 12/2016 | Cardinali et al. |
| 2019/0345026 | A1 | 11/2019 | Fürst, II et al. |

FOREIGN PATENT DOCUMENTS

| | | | | |
|---|---|---|---|---|
| CN | 205051871 | U | | 2/2016 |
| CN | 105636831 | A | | 6/2016 |
| CN | 106794980 | A | | 5/2017 |
| CN | 107251575 | A | | 10/2017 |
| DE | 112006000463 | B4 | | 2/2012 |
| EP | 2635043 | A2 | | 9/2013 |
| EP | 2635043 | A3 | | 10/2016 |
| JP | 2004235870 | A | | 8/2004 |
| JP | 2014160962 | A | * | 9/2014 |
| WO | 2016062324 | A1 | | 4/2016 |
| WO | 2017176989 | A1 | | 10/2017 |
| WO | 2018020987 | A1 | | 2/2018 |

OTHER PUBLICATIONS

Extended European Search Report in counterpart European Application No. 19838020.6-1210, mailed Mar. 21, 2022, 7 pages.

European Communication pursuant to Article 94(3) EPC in counterpart European Application No. 19 838 020.6-1207, mailed Apr. 29, 2024, 17 pages.

* cited by examiner

CONTAMINANT-PROOF MICROPHONE ASSEMBLY

BACKGROUND

Field of the Invention

The present invention relates generally to contaminant-proof microphone assemblies for devices that include one or more microphones.

Related Art

Hearing loss is a type of sensory impairment that is generally of two types, namely conductive and/or sensorineural. Conductive hearing loss occurs when the normal mechanical pathways of the outer and/or middle ear are impeded, for example, by damage to the ossicular chain or ear canal. Sensorineural hearing loss occurs when there is damage to the inner ear, or to the nerve pathways from the inner ear to the brain.

Individuals who suffer from conductive hearing loss typically have some form of residual hearing because the hair cells in the cochlea are undamaged. As such, individuals suffering from conductive hearing loss typically receive an auditory/hearing prosthesis that generates motion of the cochlea fluid. Such auditory prostheses include, for example, acoustic hearing aids, bone conduction devices, and direct acoustic stimulators.

In many people who are profoundly deaf, however, the reason for their deafness is sensorineural hearing loss. Those suffering from some forms of sensorineural hearing loss are unable to derive suitable benefit from auditory prostheses that generate mechanical motion of the cochlea fluid. Such individuals can benefit from implantable auditory prostheses that stimulate nerve cells of the recipient's auditory system in other ways (e.g., electrical, optical and the like). Cochlear implants are often proposed when the sensorineural hearing loss is due to the absence or destruction of the cochlea hair cells, which transduce acoustic signals into nerve impulses. An auditory brainstem stimulator is another type of stimulating auditory prosthesis that may be proposed when a recipient experiences sensorineural hearing loss due to damage to the auditory nerve.

SUMMARY

In one aspect, an apparatus is provided. The apparatus comprises: a housing comprising at least one acoustic port; a gasket attached to the housing and including an interior cavity disposed in-line with the acoustic port; a contaminant-proof membrane disposed between the interior cavity of the gasket and the acoustic port; a microphone comprising a sound inlet; and a microphone plug comprising a first end coupled to the microphone, a second end located within the interior cavity of the gasket such that the microphone plug is mostly disposed between the contaminant-proof membrane and the sound inlet of the microphone, and at least one through-hole.

In another aspect, an apparatus is provided. The apparatus comprises: a housing comprising at least one acoustic port; a gasket attached to the housing and including an interior cavity disposed in-line with the acoustic port; a contaminant-proof membrane disposed between the interior cavity of the gasket and the acoustic port; a microphone; and an elongate plug coupled to the microphone and configured to be inserted into the gasket, wherein the elongate plug includes at least one elongate through-hole that, when the elongate plug is inserted into the gasket, is disposed in line with the contaminant-proof membrane and the acoustic port.

In another aspect an apparatus is provided. The apparatus comprises: a housing comprising an acoustic port; a contaminant-proof membrane attached to the housing and extending across the acoustic port; a microphone comprising a sound inlet; and a microphone plug coupled to the microphone so as to form an acoustic seal around the sound inlet of the microphone, and wherein the microphone plug is configured to be inserted into, and mate with, the acoustic port to acoustically seal the microphone with the contaminant-proof membrane and the housing.

In another aspect a method is provided. The method comprises: attaching a gasket to an internal surface of a housing, wherein the gasket defines an interior cavity and has a contaminant-proof membrane connected thereto; electrically connecting a microphone to a printed circuit board (PCB), wherein the microphone comprises a sound inlet; coupling a first end of a microphone plug to the microphone such that an acoustic seal between the plug and the microphone is created; and inserting a second end of the microphone plug into the gasket such that the microphone plug is mostly disposed between the contaminant-proof membrane and the sound inlet of the microphone.

BRIEF DESCRIPTION OF THE DRAWINGS

Embodiments of the present invention are described herein in conjunction with the accompanying drawings, in which.

DETAILED DESCRIPTION

Presented herein are contaminant-proof microphone assemblies for use with devices/apparatuses, such as auditory prostheses, that include one or more microphones disposed within a housing. A contaminant-proof microphone assembly in accordance with certain embodiments presented herein includes a microphone, a microphone plug, and a contaminant-proof membrane. The microphone plug has a first end coupled to the microphone and a second end that is configured to be positioned adjacent the contaminant-proof membrane. As such, the microphone plug is disposed between a sound inlet of the microphone and the contaminant-proof membrane. The microphone plug may be configured to mate with the housing or a gasket attached to the housing.

Merely for ease of description, the contaminant-proof microphone assemblies presented herein are primarily described herein with reference to one illustrative device/apparatus, namely a cochlear implant. However, it is to be appreciated that the techniques presented herein may also be used with a variety of other apparatus that include one or more microphones positioned within a housing. For example, the techniques presented herein may be used with other auditory prostheses, including acoustic hearing aids, bone conduction devices, middle ear auditory prostheses, direct acoustic stimulators, auditory brain stimulators), etc., and/or other apparatuses in which there is a need for one or more contaminant-proof microphones to be positioned within a physical housing.

Figure 1A:
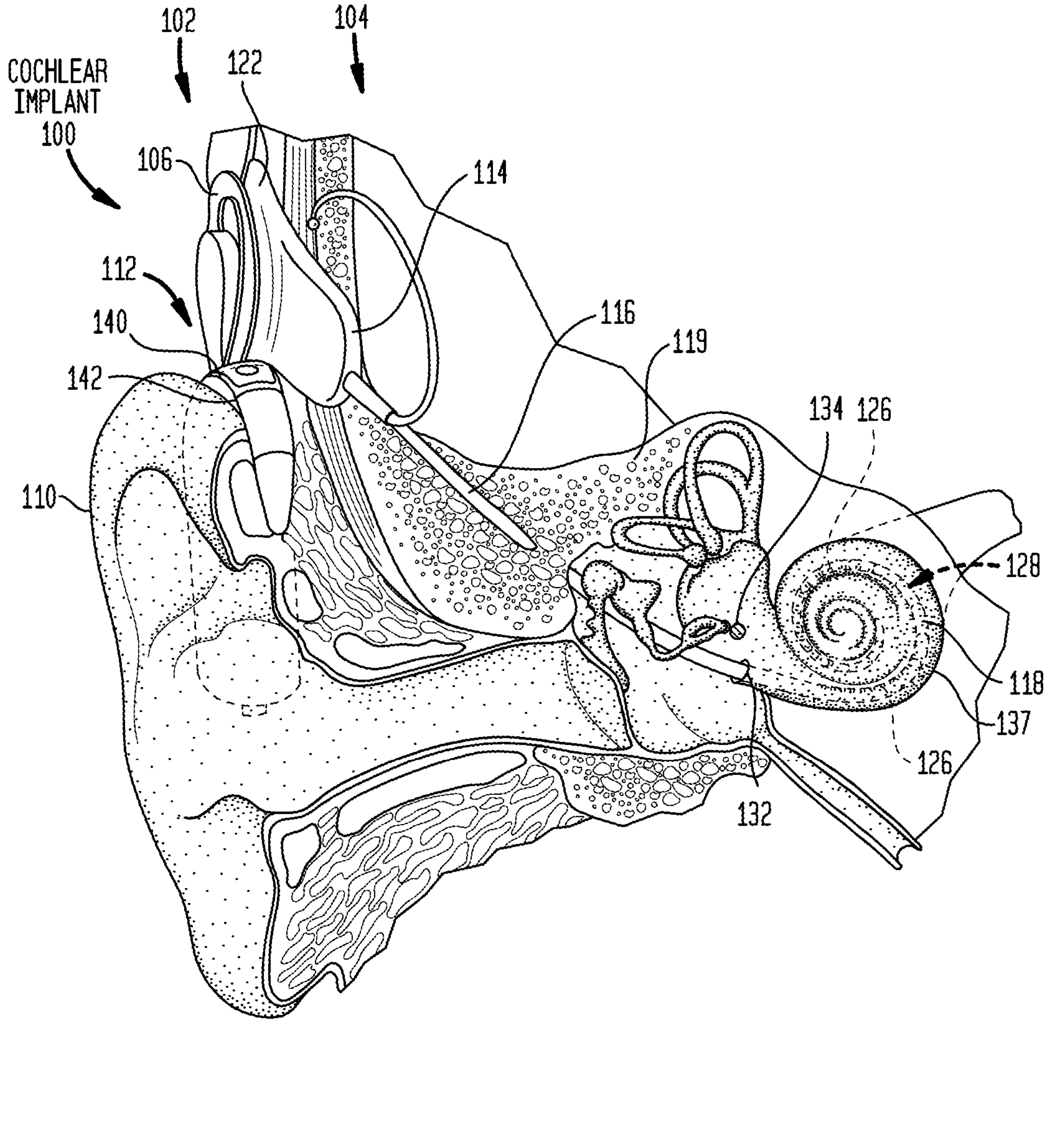
FIG. 1A is a schematic diagram illustrating a cochlear implant, in accordance with certain embodiments presented herein.
Figure 1B:
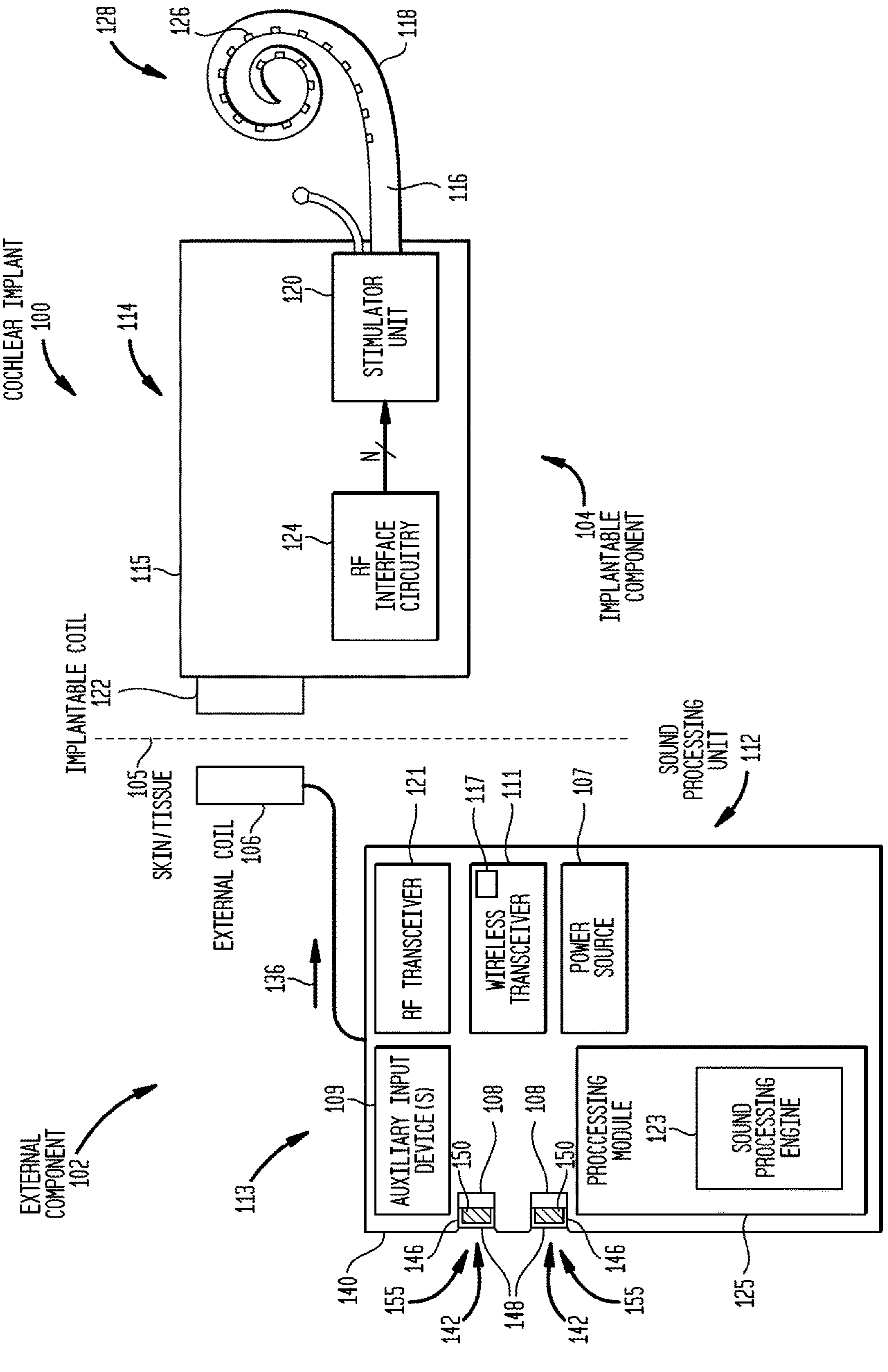
FIG. 1B is a simplified block diagram of the cochlear implant of FIG. 1A, in accordance with certain embodiments presented herein.

FIGS. 1A and 1B illustrate an exemplary cochlear implant 100 that includes two contaminant-proof microphone assemblies 155 in accordance with certain embodiments presented herein. FIG. 1A is a schematic diagram of the exemplary cochlear implant 100, while FIG. 1B is a block diagram of the cochlear implant 100. For ease of illustration, FIGS. 1A and 1B will be described together.

The cochlear implant 100 comprises an external component 102 and an internal/implantable component 104. The external component 102 is configured to be directly or indirectly attached to the body of the recipient and typically comprises an external coil 106 and, generally, a magnet (not shown in FIG. 1A) fixed relative to the external coil 106. The external component 102 also comprises one or more sound input elements/devices 113 for receiving sound signals at a sound processing unit (sound processor) 112. In this example, the one or more sound input devices 113 include a plurality of microphones 108 configured to capture/receive acoustic signals, one or more auxiliary input devices 109 (e.g., audio ports, such as a Direct Audio Input (DAI), data ports, such as a Universal Serial Bus (USB) port, cable port, etc.) configured to receive, and a wireless transmitter/receiver (transceiver) 111, each located in, on, or near the sound processing unit 112. The one or more auxiliary input devices 109 and the wireless transceiver 111 are configured to receive electrical signals that include sound data. As such, received sound signals may include acoustic signals, electrical signals that include sound data, etc. It is also to be appreciated that the sound processing unit 112 could also include other types of input devices 113, such as telecoils, which for ease of illustration have been omitted from FIGS. 1A and 1B.

The sound processing unit 112 includes a housing 140 that comprises one or more acoustic ports/openings 142 which allow acoustic sounds to enter the housing. The microphones 108, which as described below are part of the contaminant-proof microphone assemblies 155, are positioned within the housing 140 proximate to the acoustic ports 142 so as to detect the acoustic sound signals entering through the acoustic ports 142. Also disposed on the housing 140 of the sound processing unit 112 is, for example, at least one power source (e.g., battery) 107, a radio-frequency (RF) transceiver 121, and a processing module 125 that includes a sound processing engine 123. The processing module 125, and thus the sound processing engine 123, may be formed by any of, or a combination of, one or more processors (e.g., one or more Digital Signal Processors (DSPs), one or more uC cores, etc.), firmware, software, etc. arranged to perform operations described herein. That is, the processing module 125 may be implemented on a printed circuit board (PCB) or some other arrangement.

In the examples of FIGS. 1A and 1B, the external component 102 comprises a behind-the-ear (BTE) sound processing unit 112 configured to be attached to, and worn adjacent to, the recipient's ear and a separate coil 106. However, it is to be appreciated that embodiments of the present invention may be implemented with systems that include other arrangements, such as systems comprising a button sound processing unit (i.e., a component having a generally cylindrical shape and which is configured to be magnetically coupled to the recipient's head and which includes an integrated coil), a mini or micro-BTE unit, an in-the-canal unit that is configured to be located in the recipient's ear canal, a body-worn sound processing unit, etc.

Returning to the example embodiment of FIGS. 1A and 1B, the implantable component 104 comprises an implant body (main module) 114, a lead region 116, and an intra-cochlear stimulating assembly 118, all configured to be implanted under the skin/tissue (tissue) 105 of the recipient. The implant body 114 generally comprises a hermetically-sealed housing 115 in which RF interface circuitry 124 and a stimulator unit 120 are disposed. The implant body 114 also includes an internal/implantable coil 122 that is generally external to the housing 115, but which is connected to the RF interface circuitry 124 via a hermetic feedthrough (not shown in FIG. 1B).

Stimulating assembly 118 is configured to be at least partially implanted in the recipient's cochlea 137. Stimulating assembly 118 includes a plurality of longitudinally spaced intra-cochlear electrical stimulating contacts (electrodes) 126 that collectively form a contact or electrode array 128 for delivery of electrical stimulation (current) to the recipient's cochlea. Stimulating assembly 118 extends through an opening in the recipient's cochlea (e.g., cochleostomy, the round window, etc.) and has a proximal end connected to stimulator unit 120 via lead region 116 and a hermetic feedthrough (not shown in FIG. 1B). Lead region 116 includes a plurality of conductors (wires) that electrically couple the electrodes 126 to the stimulator unit 120.

As noted, the cochlear implant 100 includes the external coil 106 and the implantable coil 122. The coils 106 and 122 are typically wire antenna coils each comprised of multiple turns of electrically insulated single-strand or multi-strand platinum or gold wire. Generally, a magnet is fixed relative to each of the external coil 106 and the implantable coil 122. The magnets fixed relative to the external coil 106 and the implantable coil 122 facilitate the operational alignment of the external coil with the implantable coil. This operational alignment of the coils 106 and 122 enables the external component 102 to transmit data, as well as possibly power, to the implantable component 104 via a closely-coupled wireless link formed between the external coil 106 with the implantable coil 122. In certain examples, the closely-coupled wireless link is a radio frequency (RF) link. However, various other types of energy transfer, such as infrared (IR), electromagnetic, capacitive and inductive transfer, may be used to transfer the power and/or data from an external component to an implantable component and, as such, FIG. 1B illustrates only one example arrangement.

The processing module 125 of sound processing unit 112 is configured to convert sound/audio signals received/captured at one or more of the input elements/devices 113 into stimulation control signals 136 for use in stimulating a first ear of a recipient (i.e., the sound processing engine 123 is configured to perform sound processing on input audio signals received at the sound processing unit 112). In the embodiment of FIG. 1B, the stimulation control signals 136 are provided to the RF transceiver 121, which transcutaneously transfers the stimulation control signals 136 (e.g., in an encoded manner) to the implantable component 104 via external coil 106 and implantable coil 122. That is, the stimulation control signals 136 are received at the RF interface circuitry 124 via implantable coil 122 and provided to the stimulator unit 120. The stimulator unit 120 is configured to utilize the stimulation control signals 136 to generate electrical stimulation signals (e.g., current signals) for delivery to the recipient's cochlea via one or more stimulating contacts 126. In this way, cochlear implant 100 electrically stimulates the recipient's auditory nerve cells, bypassing absent or defective hair cells that normally transduce acoustic vibrations into neural activity, in a manner that causes the recipient to perceive one or more components of the input audio signals.

As noted, in the arrangement of FIGS. 1A and 1B, the sound processing unit 112 is an external component that, during operation, is worn by the recipient of the cochlear implant 100. Since the sound processing unit 112 includes the sound input devices 113, particularly microphones 108, and since the sound processing unit 112 is configured to process the received sound signals, the sound processing unit 112 must be worn (and operational) in order for the recipient to hear sounds. However, an auditory prosthesis recipient may encounter wet, humid, dusty, or other environments in which contaminants (e.g., water/moisture, dust, chemicals, etc.) could potentially damage the sound input elements, sound processing elements, power source, etc. within the housing 140 of the sound processing unit 112. Traditionally, in such situations a recipient has been forced to either remove the sound processing unit 112 before entering the potentially damaging environment (e.g., before swimming) or, in less extreme cases, rely on the rigid housing 140, to protect the electrical components from ingress of water, dust, or other contaminants. Both of these options are unsatisfactory and potentially create safety issues. In particular, as noted, removal of the sound processing unit 112 eliminates the recipient's ability to hear warnings, instructions, etc. Additionally, housings, such as housing 140, are not manufactured so as to prevent the total ingress of fluids, dust, and other contaminants. This creates a potential danger to the recipient if the electrical components within the sound processing unit 112 are short-circuited or otherwise damaged.

The design of a waterproof (swimmable) sound processing unit, in particular, is challenging as there are many competing mechanical design considerations. In addition, in conventional arrangements, is has been difficult to create a microphone subassembly for sound processing unit such that the microphone is protected from ingress of water (or other contaminants), while maintaining an acceptable audio quality. The techniques presented herein can address many of these practical considerations which allow a microphone to be mounted to the inside of a housing in a contaminant (e.g., water, dust, etc.) proof manner. In particular, as shown in FIG. 1B, the techniques presented herein incorporate the microphones 108 into contaminant-proof microphone assemblies 155 within the housing 140. As shown, in the embodiments of FIGS. 1A and 1B, the contaminant-proof microphone assemblies 155 include gaskets 146 positioned adjacent to each of the acoustic ports 142. The gaskets 146 may be attached to the housing 140 and include (e.g., define) an interior cavity disposed in-line with a respective acoustic port 142. A contaminant-proof membrane 148 may be disposed between the interior cavities of each of the gaskets 146 and respective acoustic ports 142 of the housing 140. In addition, FIG. 1B also illustrates that the contaminant-proof microphone assemblies 155 each include a microphone plug 150 having a first end coupled to a respective one of the microphones 108, and a second end located within the interior cavity of a respective gasket 146. As such, each of the microphones plugs 150 are disposed between a respective contaminant-proof membrane 148 and a respective sound inlet (not shown in FIG. 1B) of a microphone 108 (e.g., the microphones 108 are not surrounded by the gaskets 146 and are instead spaced a distance from the contaminant-proof membranes 148 and the gaskets by an additional component, namely the plugs 150).

As described further below, contaminant-proof microphone assemblies presented herein, such as assemblies 155, may provide one or more advantages over conventional microphone arrangements. For example, in certain embodiments, use of the microphone plugs 150 may enable the use of contaminant-proof membranes 148 having a surface area that is larger than the surface area of the acoustic membranes of the microphones 108, which improves audio quality for the recipient. In addition, also as described below, the microphone plugs 150 may enable the use of existing microphone membrane designs, but also enable the use of microelectromechanical systems (MEMS) microphones in a contaminant-proof design.

As noted, FIGS. 1A and 1B illustrate one example arrangement for the cochlear implant 100. However, it is to be appreciated that embodiments of the present invention may be implemented in cochlear implants having different arrangements, other types of auditory prostheses (e.g., hearing aids), or other apparatus/devices, such as mobile phones, requiring high microphone audio quality and a contaminant-proof design in a limited volume.

Figure 2A:
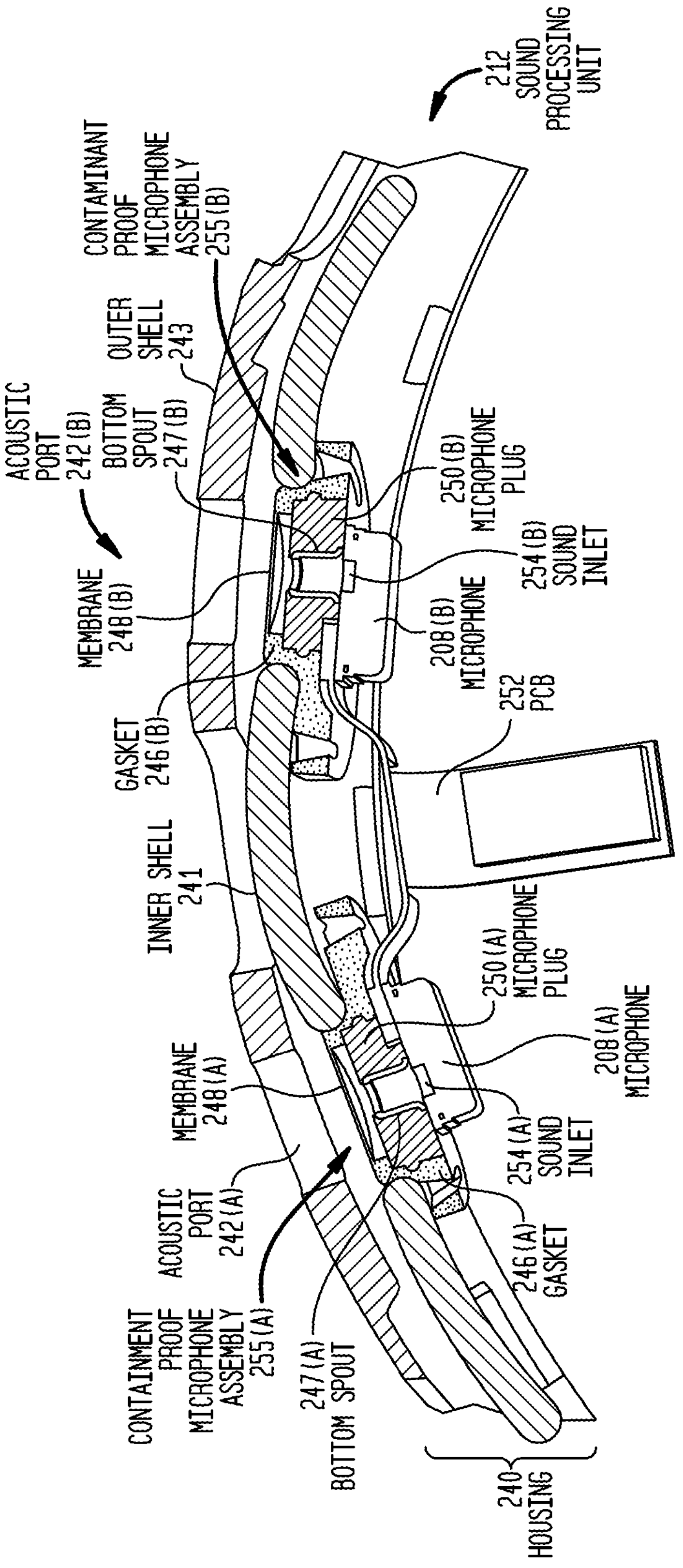
FIG. 2A is a cross-sectional view of a portion of a sound processing unit, in accordance with certain embodiments presented herein.

FIG. 2A is a cross-sectional view of a portion of an auditory prosthesis sound processing unit 212 in accordance with certain embodiments presented herein. The sound processing unit 212 comprises a housing 240. In this example, the housing 240 is formed by two layers, namely a structural inner shell 241 and a decorative outer shell 243. It is to be appreciated that the use of a two-layer housing is illustrative and that other embodiments may include a single layer housing.

The housing 240 (e.g., inner shell 241 and outer shell 243) includes two (2) acoustic ports, referred to as acoustic ports 242(A) and 242(B), which allow acoustic sounds to enter the interior of the housing. Two microphones 208(A) and 208(B) are positioned within the housing 240 each proximate to a respective one of the acoustic ports 242(A) and 242(B) so as to detect the acoustic sound signals entering through the acoustic ports. In the example of FIG. 2A, the microphones 208(A) and 208(B) include optional bottom spouts 247(A) and 247(B), respectively. The bottom spouts 247(A) and 247(B) are cylindrical components that extend away from sound inlets 254(A) and 254(B) of the microphones 208(A) and 208(B), respectively, in the direction of the acoustic ports 242(A) and 242(B), respectively. The bottom spouts 247(A) and 247(B) function to guide/steer acoustic sound signals to the sound inlets 254(A) and 254(B).

In operation, the acoustic sound signals (sound waves) entering the sound inlets 254(A) and 254(B) cause movement (vibration) of acoustic membranes (not shown in FIG. 2A) disposed in the microphones 208(A) and 208(B) adjacent to the sound inlets 254(A)/254(B). The microphones 208(A) and 208(B) each include components that are configured to convert the movement of the acoustic membranes into electrical microphone signals that represented the acoustic sound signals impinging on the acoustic membranes. Depending on the microphone design, these electrical microphone signals may be analog or digital signals.

The microphones 208(A) and 208(B) are each electrically connected to an electrical circuit and are each configured to provide the respective electrical microphone signals to this electrical circuit. In the example of FIG. 2A, the electrical circuit is implemented on a printed circuit board (PCB) 252. The sound processing unit 212 may also include other components that, for ease of illustration, have been omitted from FIG. 2A.

FIG. 2A illustrates an embodiment that includes two contaminant-proof microphone assemblies, referred to as contaminant-proof microphone assembly 255(A) and 255(B). The contaminant-proof microphone assembly 255(A) is comprised of microphone 208(A), microphone plug 250(A), gasket 246(A), bottom spout 247(A), and contaminant-proof membrane 248(A), sometimes referred to herein simply as "membrane 248(A)." Similarly, contaminant-proof microphone assembly 255(B) is comprised of microphone 208(B), microphone plug 250(B), gasket 246(B), bottom spout 247(B), and membrane 248(B). For ease of description, only contaminant-proof microphone assembly 255(A) is described in further detail below. However, it would be appreciated that contaminant-proof microphone assembly 255(B) may be substantially similar to contaminant-proof microphone assembly 255(A).

Further details of contaminant-proof microphone assembly 255(A) are described with reference to both FIG. 2A and FIG. 2B, which is a cross-sectional view that illustrates further details of the contaminant-proof microphone assembly 255(A). As noted, contaminant-proof microphone assembly 255(A) includes a gasket 246(A). In this example, gasket 246(A) is a substantially cylindrical component that defines a cylindrical interior cavity 260(A). Additionally, the gasket 246(A) is formed from a resiliently flexible material (e.g., silicone, rubber, etc.) and, as shown in FIG. 2A, is attached to internal shell 241 of the housing 240. In certain examples, the gasket 246(A) may be overmolded onto the housing 240.

The cylindrical interior cavity 260(A) is disposed in-line with the acoustic port 242(A) (FIG. 2A). The membrane 248(A) is disposed between the interior cavity 260(A) of the gasket 246(A) and the acoustic port 242(A). The membrane 248(A) is sometimes referred to herein as being acoustically transparent (e.g., penetrable by sound waves/energy without altering frequency response) and contaminant-proof (e.g., impenetrable by water, dust, and other contaminants). Stated differently, when the membrane 248(A) is in a non-damaged state, the membrane allows acoustic signals to reach the sound inlet 254(A) of the microphone, but does not allow water, dust or other material that could damage the internal workings of the microphone to pass there though.

The membrane 248(A) is connected to the gasket 246(A) to form an acoustic chamber with the interior cavity 260(A) of the gasket. In the example of FIGS. 2A and 2B, the membrane 248(A) is integral/unitary with the gasket 246(A) (e.g., the gasket 246(A) and the membrane 248(A) are formed as a single component). However, it is to be appreciated that, in alternative embodiments, the membrane 248(A) and the gasket 246(A) may be separate elements that are joined/connected together via, for example, adhesive, ultrasonically welding, etc.

Returning to FIG. 2B, as noted the microphone 208(A) includes a sound inlet 254(A). In this example, the generally cylindrical bottom spout 247(A) extends from the microphone 208(A) adjacent the sound inlet 254(A).

As noted above, the contaminant-proof microphone assembly 255(A) also comprises the microphone plug 250(A), which includes a first end 262(A) and a second end 263(A). The microphone plug 250(A) is an elongate element that includes an elongate through-hole 251(A) extending from the first end 262(A) to the second end 263(A) of the plug. In addition, the first end 262(A) is directly coupled to (e.g., directly mechanically attached to) the microphone 208(A) such that the bottom spout 247(A) is positioned in the through-hole 251(A), while the second end 263(A) is configured to be inserted into the interior cavity 260(A) of the gasket 246(A).

In certain embodiments, the microphone 208(A) could be soldered to the PCB 252. The microphone plug 250(A) may be, for example, soldered, glued, soldered and glued, etc. to the microphone 208(A). The microphone plug 250(A) and microphone 208(A) can then be inserted into the gasket 246(A).

Figure 2B:
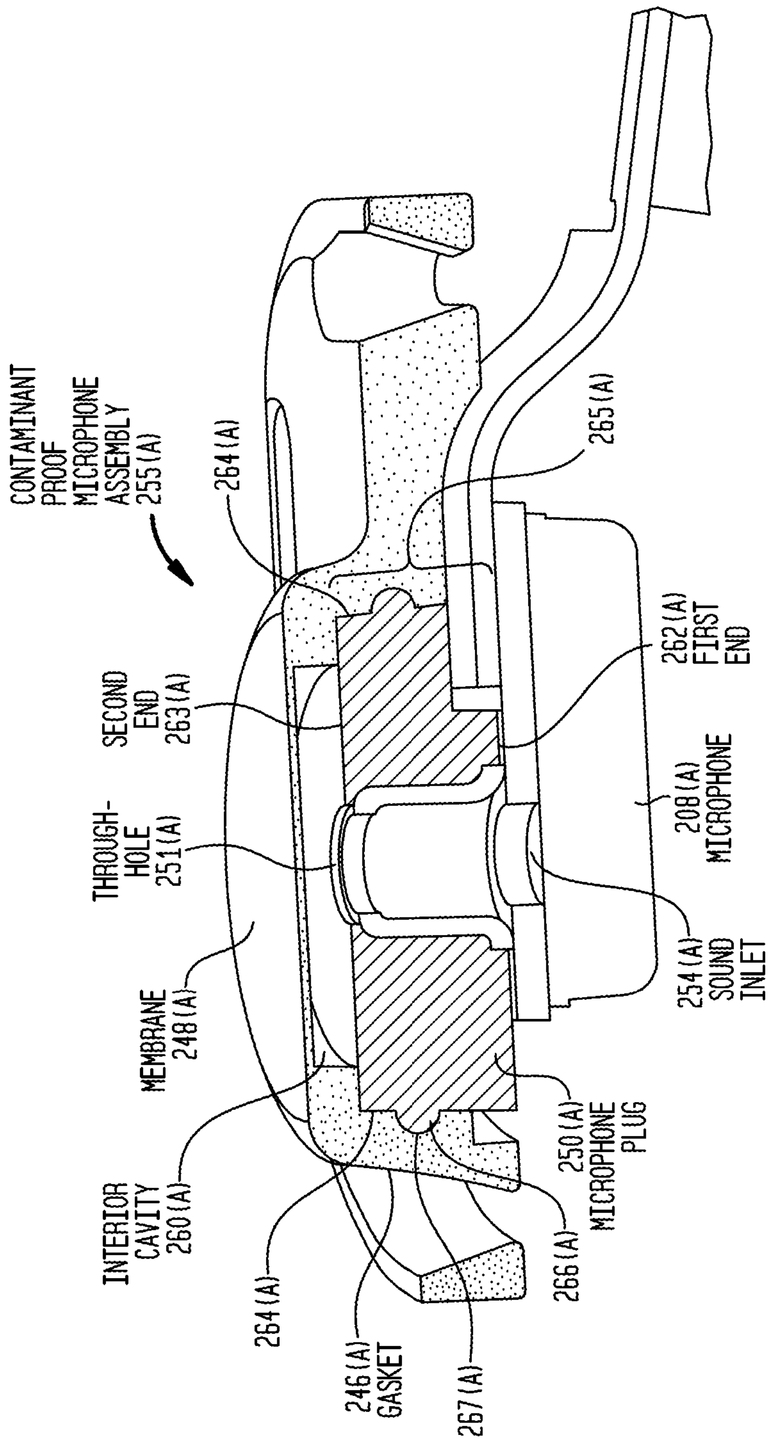
FIG. 2B is a cross-sectional view illustrating further details of a contaminant-proof microphone assembly of the sound processing unit of FIG. 2A, in accordance with certain embodiments presented herein.

As shown in FIG. 2B, when the second end 263(A) is fully inserted into the interior cavity 260(A), the microphone plug 250(A) is positioned/disposed between the membrane 248(A) and the sound inlet 254(A) of the microphone 208(A). In addition, when the second end 263(A) is fully inserted into the interior cavity 260(A), central axis of each of the sound inlet 254(A) and through-hole 251(A) are generally aligned with the membrane 248(A) and the acoustic port 242(A) (FIG. 2A) and the through-hole 251(A) acoustically couples sound inlet 254(A) of the microphone to the membrane 248(A). The microphone plug 250(A) also has an elongate length 265(A) that spaces the sound inlet 254(A) from the membrane 248(A) and, therefore from the external surface of the housing 240 where sound enters the acoustic port 242(A). In this example, the through-hole 251(A) has a cross-sectional area that is substantially smaller than a surface area of the membrane 248(A).

In certain examples, the microphone plug 250(A) is formed from a material that is relatively more rigid than the resiliently flexible material of the gasket 246(A). In addition, the interior cavity 260(A) has an inner dimension (e.g., inside diameter) between the sidewalls 264(A) that is smaller than an outer dimension (e.g., outside diameter) of the microphone plug 250(A). As such, when the microphone plug 250(A) is inserted into the interior cavity 260(A) of the gasket 246(A), the microphone plug 250(A) is configured to compress the sidewalls 264(A) of the gasket 246(A) (i.e., the walls surrounding/defining the sides of the interior cavity 260(A)) to mate the elongate plug with the gasket. In certain embodiments, the compression of the sidewalls 264(A) is sufficient to retain the microphone plug 250(A) within the gasket 246(A). However, in further embodiments, such as that shown in FIG. 2B, the sidewalls 264(A) and the microphone plug 250(A) may include corresponding interlocking features configured to releasably lock the microphone plug within the gasket.

In the embodiment of FIGS. 2A and 2B, the corresponding interlocking features comprise one or more convex members (e.g., protrusions/projections) 266(A) extending from the microphone plug 250(A) and one or more corresponding concavities (e.g., depressions/indentations) 267(A) disposed in sidewall 264(A). In this example, the one or more convex members 266(A) and the one or more concavities 267(A) have corresponding shapes/sizes so that the convex members mate with the concavities (e.g., releasably locking the microphone plug 250(A) within the gasket 246(A)). In accordance with embodiments presented herein, the one or more convex members 266(A) and the one or more concavities 267(A) may have a number of different corresponding shapes and different locations. For example, the one or more convex members 266(A) could instead be disposed on the sidewall 264(A) and one or more concavities 267(A) formed in the microphone plug 250(A). Additionally, different numbers and types of corresponding interlocking features may be used in different embodiments.

As noted above, prior to inserting the microphone plug 250(A) into the gasket 246(A), the first end of the plug is mechanically coupled to the microphone 208(A). This mechanical coupling ensures that an acoustic seal is formed around the microphone 208(A). In general, an acoustic seal means that sound from outside the device substantially does not enter between the housing 240/gasket 246(A) and the microphone 208(A), nor does sound otherwise enter the main volume of the housing 240 around the microphone (e.g., the sound inlet 254(A) and the microphone 208(A) is the only acoustic path for sound).

In the embodiments of FIGS. 2A and 2B, the presence of the microphone plug 250(A) between the sound inlet 254(A) of the microphone 208(A) and the gasket 246(A) may be advantageous over conventional arrangements. For example, the amount of acoustic energy that can get through a membrane is limited by the surface area of the membrane. The presence of the microphone plug 250(A) enables membrane 248(A) to be made artificially large, rather than limited to the size of the sound inlet 254(A) and acoustic membrane of the microphone 208(A), as is typically required in conventional arrangements. In certain examples, the membrane 248(A) may be in the order of 1.5 to 2 times as large as the acoustic membrane of the microphone 208(A). That is, in order to create a compact device, a small microphone is desirable. However, the smaller the membrane, the more the sound is attenuated by the membrane. Electrical amplification of the microphone output signal is limited by the electrical noise floor of the microphone. Therefore a greater effective microphone sensitivity is possible with a larger membrane area. A higher signal to noise ratio (and therefore better audio quality) may also be possible with a larger membrane area.

In summary, FIGS. 2A and 2B illustrate an arrangement for mounting microphones 208(A) and 208(B) (and/or other acoustic components) within a sound processing unit housing 240 such that there exists a substantially cylindrical or conical component (e.g., microphone plugs 250(A) and 250(B)) to which the microphones are fixed. The microphone plugs 250(A) and 250(B) are disposed between the microphones 208(A) and 208(B) and the gaskets 246(A) and 246(B), respectively, such that microphones are not surrounded by the gaskets. In the addition, the microphone plugs 250(A) and 250(B) securely mate with the gaskets 246(A) and 246(B) so as to retain the microphones 208(A) and 208(B) at selected positions in the housing 240, and do so in a contaminant (e.g., water, dust, etc.) proof manner.

FIGS. 2A and 2B generally illustrate embodiments of contaminant-proof microphone assemblies that include Electret Condenser Microphones (ECM) microphones. In contrast, FIGS. 3A, 3B, and 3C illustrate embodiments of contaminant-proof microphone assemblies that include microelectromechanical systems (MEMS) microphones.

Figure 3A:
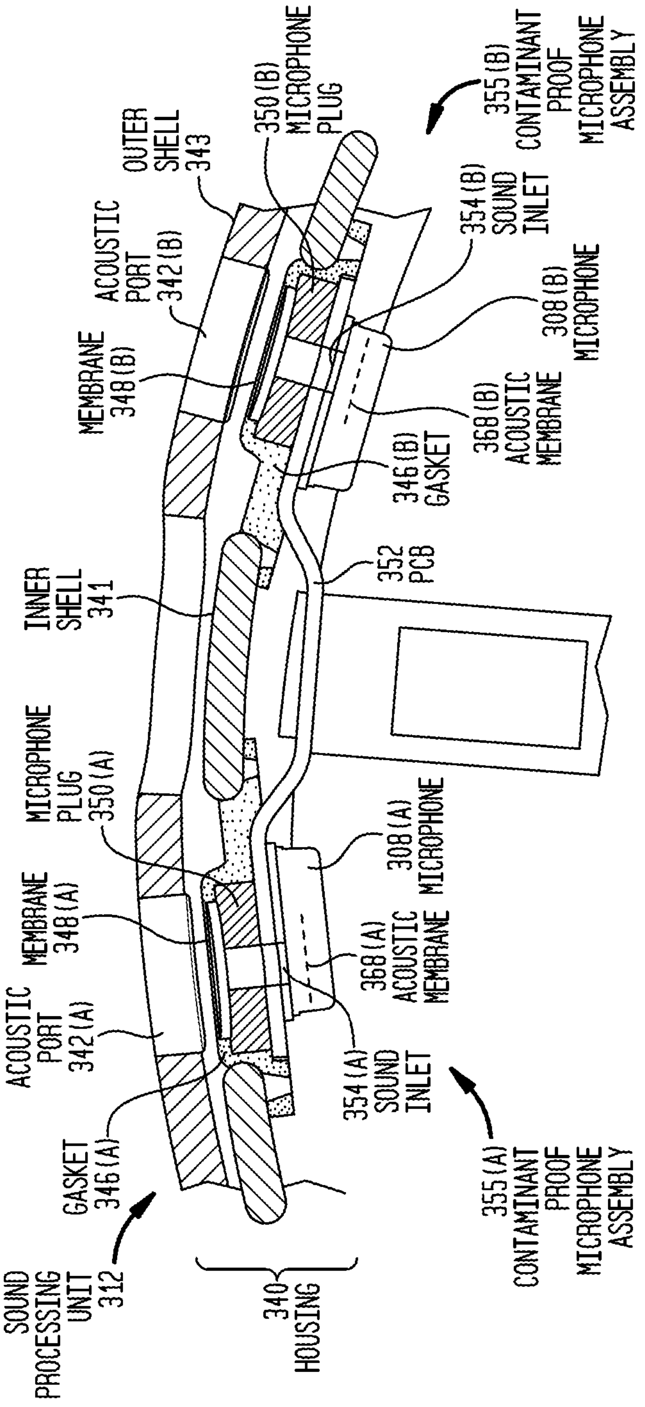
FIG. 3A is a cross-sectional view of a portion of a sound processing unit, in accordance with certain embodiments presented herein.
Figure 3B:
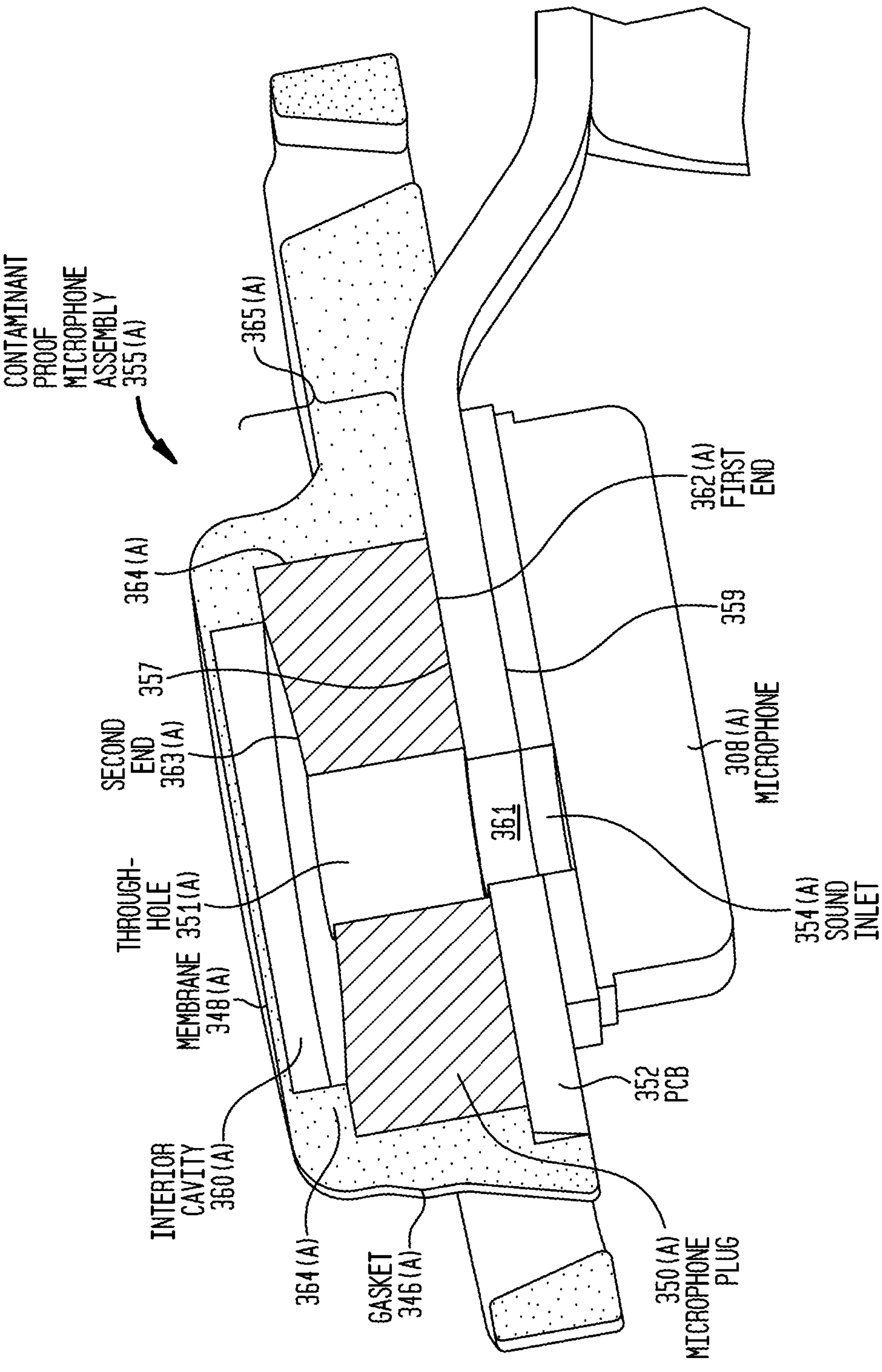
FIG. 3B is a cross-sectional view illustrating further details of a contaminant-proof microphone assembly of the sound processing unit of FIG. 3A, in accordance with certain embodiments presented herein.
Figure 3C:
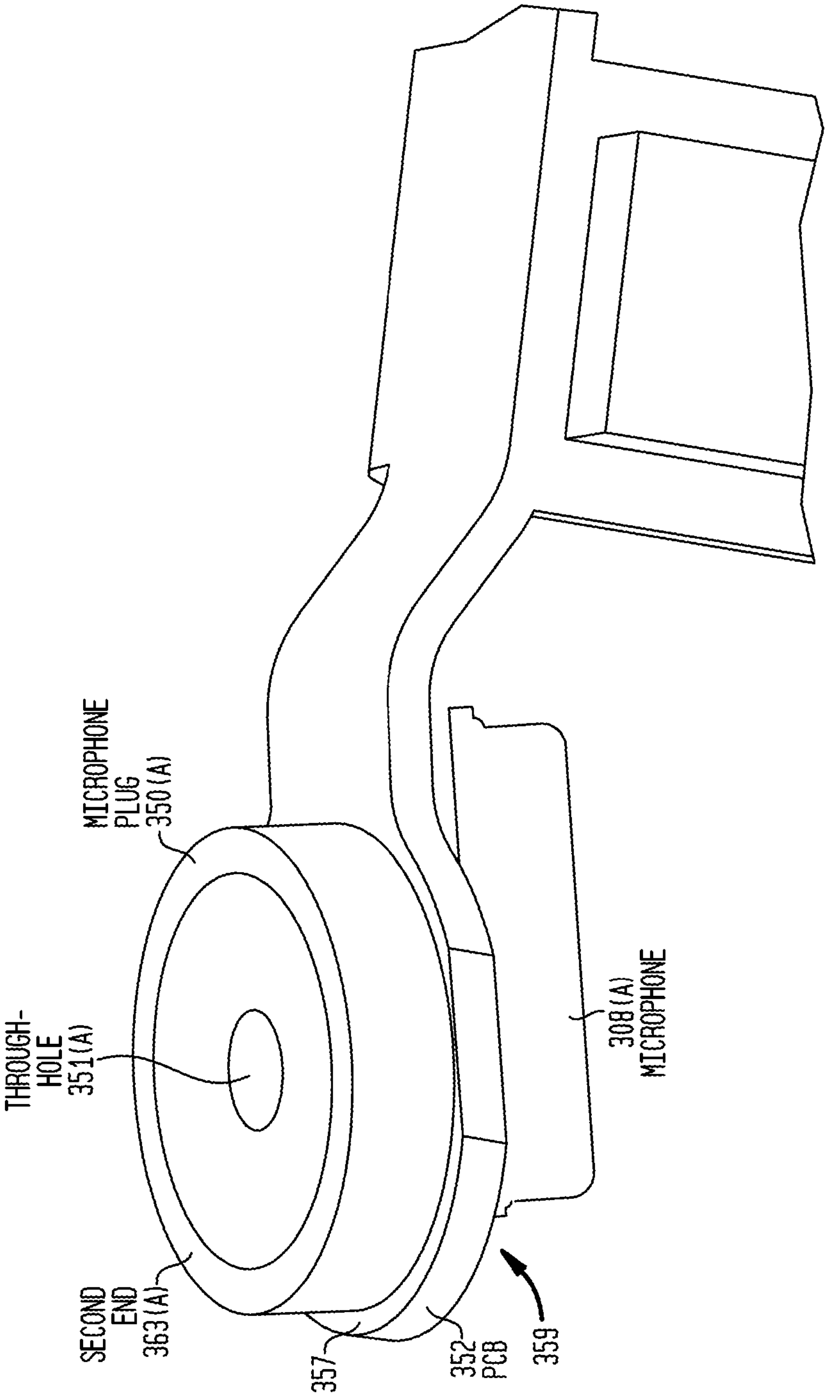
FIG. 3C is a perspective view illustrating further details of a contaminant-proof microphone assembly of the sound processing unit of FIG. 3A, in accordance with certain embodiments presented herein.

Referring first to FIG. 3A, shown is a cross-sectional view of a portion of a sound processing unit 312 in accordance with certain embodiments presented herein. The sound processing unit 312 comprises a housing 340. In this example, the housing 340 is formed by two layers, namely a structural inner shell 341 and a decorative outer shell 343. It is to be appreciated that the use of a two-layer housing is illustrative and that other embodiments may include a single layer housing.

The housing 340 (e.g., inner shell 341 and outer shell 343) includes two (2) acoustic ports, referred to as acoustic ports 342(A) and 342(B), which allow acoustic sounds to enter the interior of the housing. Two microphones 308(A) and 308(B) are positioned within the housing 340 each proximate to a respective one of the acoustic ports 342(A) and 342(B) so as to detect the acoustic sound signals entering through the acoustic ports. In the example of FIG. 3A, the microphones 308(A) and 308(B) are MEMS microphones. The microphones 308(A) and 308(B) include sound inlets 354(A) and 354(B), respectively, in the direction of the acoustic ports 342(A) and 342(B), respectively.

In operation, the acoustic sound signals (sound waves) entering the sound inlets 354(A) and 354(B) cause movement (vibration) of acoustic membranes 368(A) and 368(B) disposed in the microphones 308(A) and 308(B), respectively. The microphones 308(A) and 308(B) each include components that are configured to convert the movement of the acoustic membranes 368(A) and 368(B), respectively, into electrical microphone signals that represented the acoustic sound signals impinging on the acoustic membranes.

The microphones 308(A) and 308(B) are each electrically connected to an electrical circuit and are each configured to provide the respective electrical microphone signals to this electrical circuit. In the examples of FIG. 3A-3C, the electrical circuit is implemented on a printed circuit board (PCB) 352. The sound processing unit 312 may also include other components that, for ease of illustration, have been omitted from FIG. 3A.

FIG. 3A illustrates an embodiment that includes two contaminant-proof microphone assemblies, referred to as contaminant-proof microphone assembly 355(A) and 355 (B). The contaminant-proof microphone assembly 355(A) is comprised of microphone 308(A), microphone plug 350(A), gasket 346(A), and contaminant-proof membrane 348(A), sometimes referred to herein simply as "membrane 348(A)." Similarly, contaminant-proof microphone assembly 355(B) is comprised of microphone 308(B), microphone plug 350 (B), gasket 346(B), and membrane 348(B). For ease of description, only contaminant-proof microphone assembly 355(A) is described in further detail below. However, it would be appreciated that contaminant-proof microphone assembly 355(B) may be substantially similar to contaminant-proof microphone assembly 355(A).

Further details of contaminant-proof microphone assembly 355(A) are described with reference to FIG. 3A, FIGS. 3B, and 3C. FIG. 3B is a cross-sectional view illustrating further details of the contaminant-proof microphone assembly 355(A), while FIG. 3C is a perspective view of the contaminant-proof microphone assembly 355(A).

As noted, contaminant-proof microphone assembly 355 (A) includes gasket 346(A). The gasket 346(A) may have, for example, a cylindrical shape that defines a cylindrical interior cavity 360(A) disposed in-line with the acoustic port 342(A) (FIG. 3A). One advantage of the use of a microphone plug, such as microphone plug 350(A), is that the mating surfaces between the plug and the gasket can be substantially cylindrical or conical, regardless of the geometry of the microphone. It is easier to achieve an acceptable acoustic seal between the plug and the gasket with this geometry because mating surfaces which are radially symmetrical (such as a cylinder or cone) create an even distribution of stress in the compressed component (in this case the gasket).

Additionally, the gasket 346(A) is formed from a resiliently flexible material (e.g., silicone, rubber, etc.) and, as shown in FIG. 3A, is attached to internal shell 341 of the housing 340. In certain examples, the gasket 346(A) may be overmolded onto the housing 340.

The cylindrical interior cavity 360(A) is disposed in-line with the acoustic port 342(A) (FIG. 3A). As shown in FIG. 3A, the membrane 348(A) is disposed between the interior cavity 360(A) of the gasket 346(A) and the acoustic port 342(A). The membrane 348(A) is sometimes referred to herein as being acoustically transparent (e.g., penetrable by sound waves/energy without altering frequency response) and contaminant-proof (e.g., impenetrable by water, dust, and other contaminants).

The membrane 348(A) is connected to the gasket 346(A) to form an acoustic chamber with the interior cavity 360(A) of the gasket. In the example of FIGS. 3A and 3B, the membrane 348(A) is integral/unitary with the gasket 346(A) (e.g., the gasket 346(A) and the membrane 348(A) are formed as a single component). However, it is to be appreciated that, in alternative embodiments, the membrane 348 (A) and the gasket 346(A) may be separate elements that are joined/connected together via, for example, adhesive, ultrasonically welding, etc.

As noted, the contaminant-proof microphone assembly 355(A) comprises the microphone plug 350(A), which includes a first end 362(A), a second end 363(A), and through-hole 351(A). The through-hole 351(A) extends from the first end 362(A) to the second end 363(A). In addition, the first end 362(A) is directly mechanically coupled to (e.g., directly attached to) a first surface 357 of the PCB 352. The microphone 308(A) is directly mechanically coupled to (e.g., directly attached to) a second surface 359 of the PCB 352. In other words, in FIGS. 3A-3C, the microphone plug 350(A) is indirectly coupled to the microphone 308(A) via PCB 352 such that the PCB 352 is located between the microphone plug 350(A) and the sound inlet 354(A).

In certain embodiments, the microphone 308(A) could be soldered to the PCB 352 (with a hole/opening 361 in the PCB allowing an acoustic path through the PCB to the sound inlet 354(A) of the microphone). The cylindrical plug 350 (A) may be, for example, soldered, glued, soldered and glued, etc. to the PCB 352. The microphone plug 350(A) and microphone 308(A) can then be inserted into the gasket 346(A).

As noted, the microphone 308(A) is a MEMS microphone. An advantage to the use of a MEMS microphone is that it can be attached to the PCB 352 via an automated process, which facilitates more efficient manufacturing. In certain examples, the MEMS microphone 308(A) can be attached to the PCB 353 via an automated soldering process. For example, the MEMS microphone 308(A) can be reflow soldered to a PCB at the same time as other components, which removes a hand soldering step. As such, one of the advantages of the architectures presented herein was that it could lead to the automation of the manufacturing process.

Additionally, the use of the MEMS microphone 308(A)) is enabled by the microphone plug 350(A). More specifically, MEMS microphones have an irregular shape that is difficult to support and seal using conventional techniques. The microphone plug 350(A) addresses these issues by both sealing the MEMS microphone and providing a support structure for the MEMS microphone.

As shown in FIG. 3B, when the second end 363(A) of the microphone plug 350(A) is fully inserted into the interior cavity 360(A), the microphone plug 350(A) is generally/mostly positioned/disposed between the membrane 348(A) and the sound inlet 354(A) of the microphone 308(A). In addition, when the second end 363(A) is fully inserted into the interior cavity 360(A), central axis of each of the sound inlet 354(A) and through-hole 351(A) are generally aligned with the membrane 348(A) and the acoustic port 342(A) (FIG. 3A) and the through-hole 351(A) acoustically couples sound inlet 354(A) of the microphone to the membrane 348(A). The microphone plug 350(A) also has an elongate length 365(A) to space the sound inlet 354(A) from the membrane 348(A) and, therefore from the external surface of the housing 340 where sound enters the acoustic port 342(A). As shown, the sound inlet 354(A) is aligned with the through-hole 351(A). In this example, the through-hole 351(A) has a cross-sectional area that is substantially smaller than a surface area of the membrane 348(A).

In certain examples, the microphone plug 350(A) is formed from a material that is relatively more rigid than the resiliently flexible material of the gasket 346(A). In addition, the interior cavity 360(A) has an inner dimension (e.g., inside diameter) between the sidewalls 364(A) that is smaller than an outer dimension (e.g., outside diameter) of the microphone plug 350(A). As such, when the microphone plug 350(A) is inserted into the interior cavity 360(A) of the gasket 346(A), the microphone plug 350(A) is configured to compress the sidewalls 364(A) of the gasket 346(A) (i.e., the walls surrounding/defining the sides of the interior cavity 360(A)). In certain embodiments, the compression of the sidewalls 364(A) is sufficient to retain the microphone plug 350(A) within the gasket 346(A). However, in further embodiments, such as that shown in FIG. 3B, the sidewalls 364(A) and the microphone plug 350(A) may include corresponding interlocking features configured to releasably lock the microphone plug within the gasket.

As noted above, prior to inserting the microphone plug 350(A) into the gasket 346(A), the first end of the plug is mechanically coupled to the microphone 308(A). This mechanical coupling ensures that an acoustic seal is formed around the microphone 308(A). In general, an acoustic seal means that sound from outside the device substantially does not enter between the gasket 346(A) and the microphone 308(A), nor does sound otherwise enter the main volume of the housing 340 around the microphone (e.g., the sound inlet 354(A) and the microphone 308(A) is the only acoustic path for sound.

In the embodiments of FIGS. 3A-3C, the presence of the microphone plug 350(A) between the sound inlet 354(A) of the microphone 308(A) and the gasket 346(A) may be advantageous over conventional arrangements. For example, the use of the microphone plug 350(A) to form an acoustic seal around the microphone 308(A) facilitates the use of MEMS microphones. That is, the use of the plug component creates a, for example, cylindrical or conical sealing surface around the microphone sound inlet 354(A) at the first surface 357 of the PCB 352, regardless of the shape or arrangement of the microphone 308(A), which may be the case with MEMS microphones.

Additionally, as noted above, the amount of acoustic energy that can get through a membrane is limited by the surface area of the membrane. The presence of the microphone plug 350(A) enables membrane 348(A) to be made artificially large, rather than limited to the size of the sound inlet 354(A) and acoustic membrane 368(A) of the microphone 308(A), as is typically required in conventional arrangements.

In summary, FIGS. 3A and 3B illustrate an arrangement for mounting microphones 308(A) and 308(B) (and/or other acoustic components) within a sound processing unit housing 340 such that there exists a substantially cylindrical or conical component (e.g., microphone plugs 350(A) and 350(B)) to which the microphones are fixed. The microphone plugs 350(A) and 350(B) are disposed between the microphones 308(A) and 308(B) and the gaskets 346(A) and 346(B), respectively, such that microphones are not surrounded by the gaskets. In the addition, the microphone plugs 350(A) and 350(B) securely mate with the gaskets 346(A) and 346(B) so as to retain the microphones 308(A) and 308(B) at selected positions in the housing 340, and do so in a contaminant (e.g., water, dust, etc.) proof manner.

It is to be appreciated that the examples shown in FIGS. 2A-2B and 3A-3C are illustrative and that contaminant-proof microphone assemblies in accordance with certain embodiments presented herein may have a number of different arrangements, additional features, etc. For example, microphone plugs and/or gaskets in accordance with embodiments presented herein may have a number of different shapes and sizes. In addition, the contaminant-proof microphone assemblies in accordance with certain embodiments presented herein may be used with a number of different microphone types and shapes, and may be used within a number of different housings.

Figure 4:
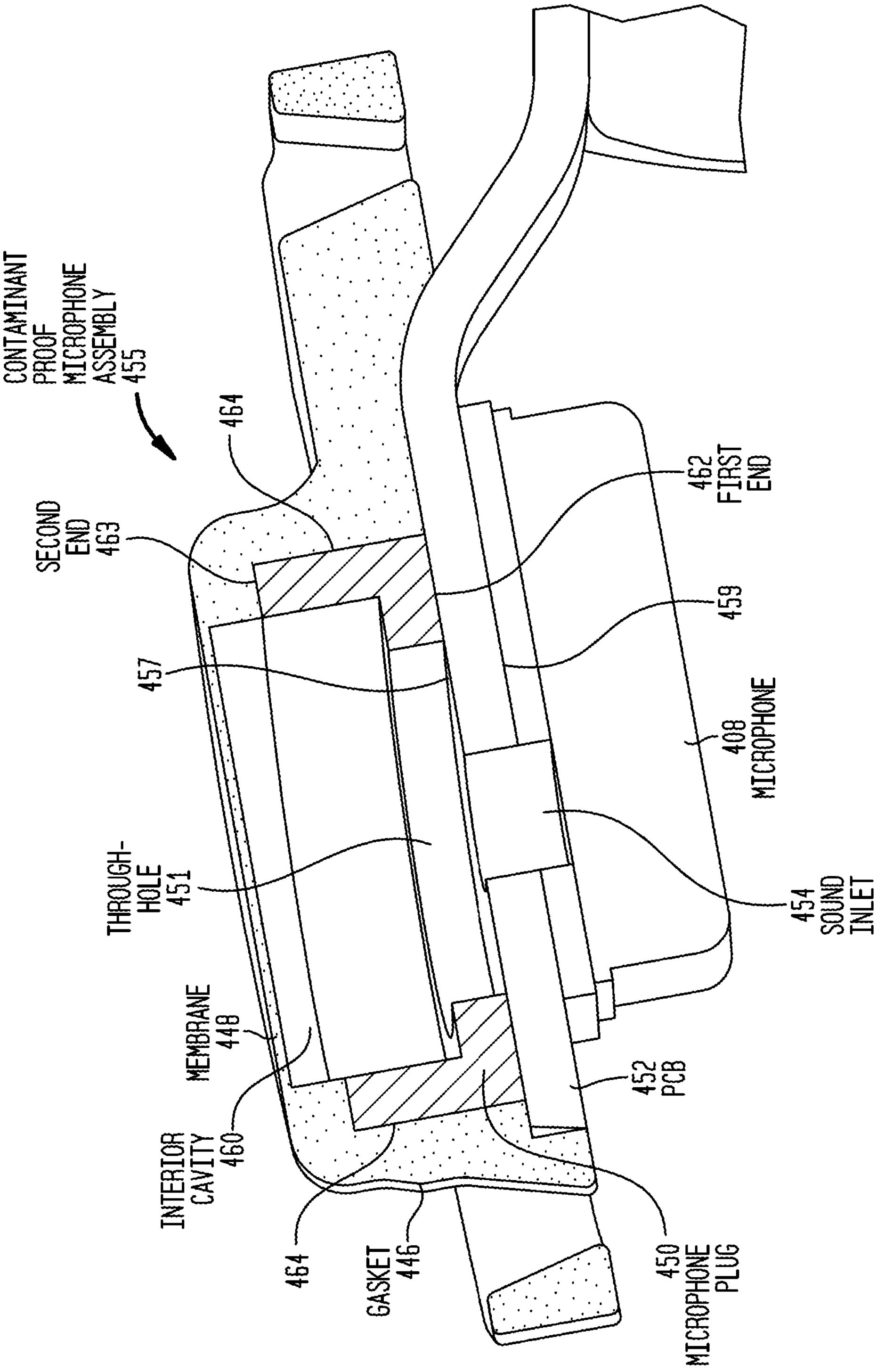
FIG. 4 is a cross-sectional view of a contaminant-proof microphone assembly, in accordance with certain embodiments presented herein.

FIG. 4 is a diagram illustrating one example alternative arrangement for a contaminant-proof microphone assembly in accordance with certain embodiments presented. More specifically, shown in FIG. 4 is a contaminant-proof microphone assembly 455 that, similar to contaminant-proof microphone assembly 355(A) of FIGS. 3A-3C, comprises MEMS microphone 408, a microphone plug 450, a gasket 446, and a contaminant-proof membrane ("membrane") 448.

In the arrangement of FIG. 4, gasket 446 may have, for example, a cylindrical shape that defines an interior cavity 460 disposed in-line with the acoustic port (not shown in FIG. 4) of a housing. Additionally, the gasket 446 is formed from a resiliently flexible material and is configured to be attached to the internal surface of a housing (not shown in FIG. 4). As shown in FIG. 4, the membrane 448 is disposed between the interior cavity 460 of the gasket 446 and the acoustic port of the housing. The membrane 448 is also acoustically transparent.

As noted, the contaminant-proof microphone assembly 455 includes the microphone plug 450, which comprises a first end 462, a second end 463, and a through-hole 451. The through-hole 451 extends from the first end 462 to the second end 463. As shown in FIG. 4, the through-hole 451 has a cross-sectional shape and area that generally matches (corresponds to) to the shape and area of the membrane 448. This is in contrast to the arrangement of FIGS. 3A-3B in which the through-hole 351(A) has a cross-sectional shape and area that is significantly smaller than the shape and area of the membrane 348(A). The larger through-hole 451 may be advantageous in certain embodiments by maximizing the amount of acoustic energy transferred from the membrane 448 to the sound microphone 408.

As shown in FIG. 4, the first end 462 is directly mechanically coupled to (e.g., directly attached to) a first surface 457 of the PCB 452. The microphone 408 is directly mechanically coupled to (e.g., directly attached to) a second surface 459 of the PCB 452. In other words, in FIGS. 4, the microphone plug 450 is indirectly coupled to the microphone 408 via PCB 452. Sound inlet 454 is aligned with the through-hole 451.

Figure 5:
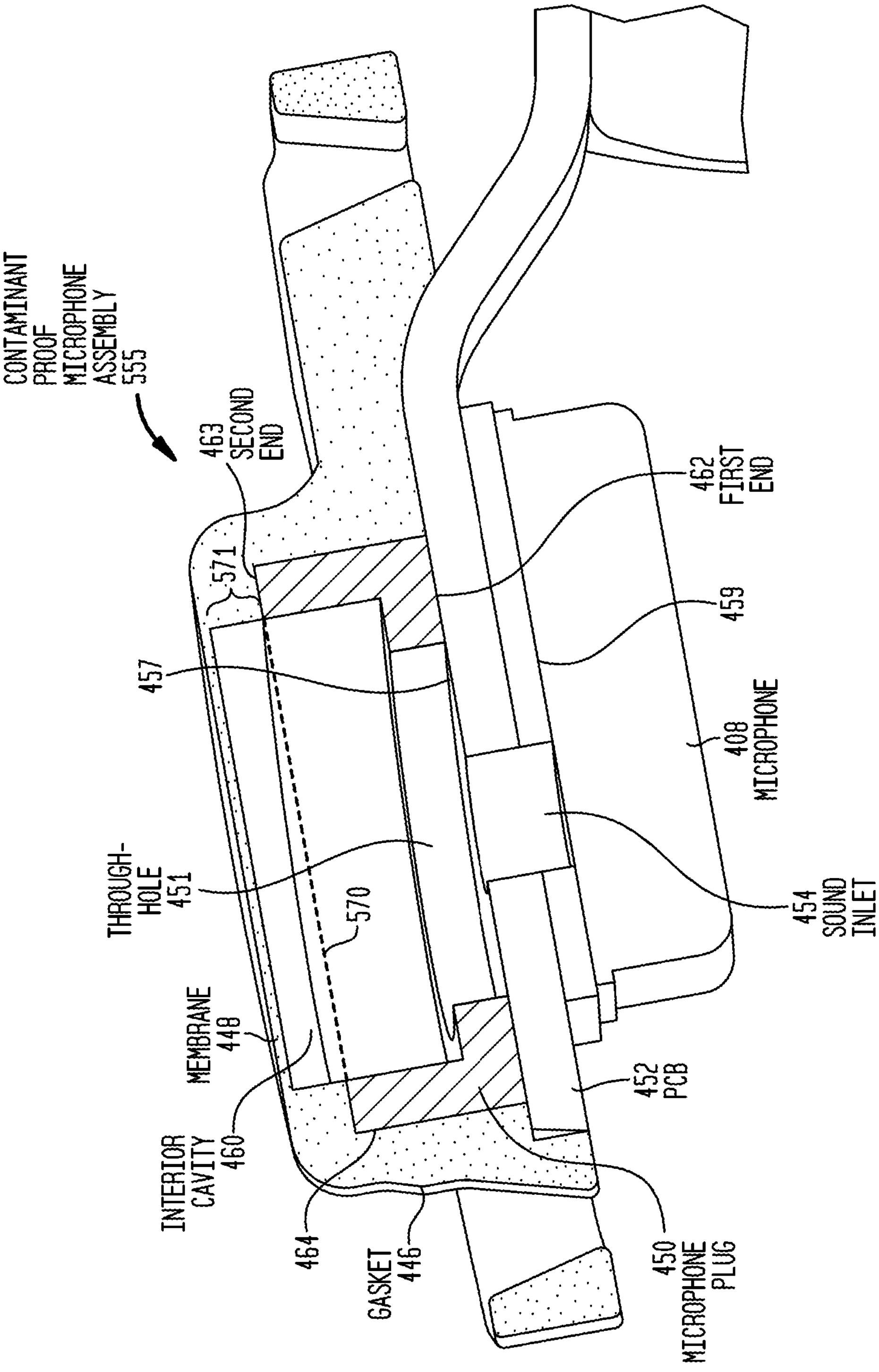
FIG. 5 is a cross-sectional view of a contaminant-proof microphone assembly, in accordance with certain embodiments presented herein.

FIG. 5 is a diagram illustrating another alternative arrangement for a contaminant-proof microphone assembly in accordance with certain embodiments presented. More specifically, shown in FIG. 5 is a contaminant-proof microphone assembly 555 that, similar to contaminant-proof microphone assembly 455 of FIG. 4, comprises the MEMS microphone 408, the microphone plug 450, the gasket 446, and the contaminant-proof membrane 448, all implemented as described above with reference to FIG. 4.

In addition to the above elements, in the specific example of FIG. 5, the contaminant-proof microphone assembly 555 also comprises a protective member 570. As shown, in the example of FIG. 5, the protective member 570 is a protective mesh that is disposed at the second end 462 of the microphone plug 450 and extends across the through-hole 451. That is, the protective mesh 570 sits parallel to the membrane 448, but is spaced a distance 571 away from the membrane 448 such that when, for example, high external water pressure is applied, the membrane 448 presses against the mesh 570 before reaching its yield stress. The protective mesh 570 has sufficient strength so as to prevent further deformation of the membrane 448, but is also substantially acoustically transparent. In certain examples, the protective mesh 570 may be formed from, for example, polyester, Acrylonitrile butadiene styrene (ABS), etc.

The protective mesh 570 may be integrated with the plug 450 or may be a separate component placed between the plug 450 and the gasket 446. In certain embodiments, the protective mesh 570 may be affixed to the second 463 of the microphone plug 450.

In summary FIG. 5 illustrates an embodiment in which a protective member (e.g., mesh) is provided to limit deformation/deflection (and prevent breakage) of the membrane under high external water pressure. As a result, the microphone is located outside of a deflection region of the membrane (e.g., deflection of the membrane under high water pressure would cause the membrane to contact another component (the plug), not the microphone itself).

Figure 6A:
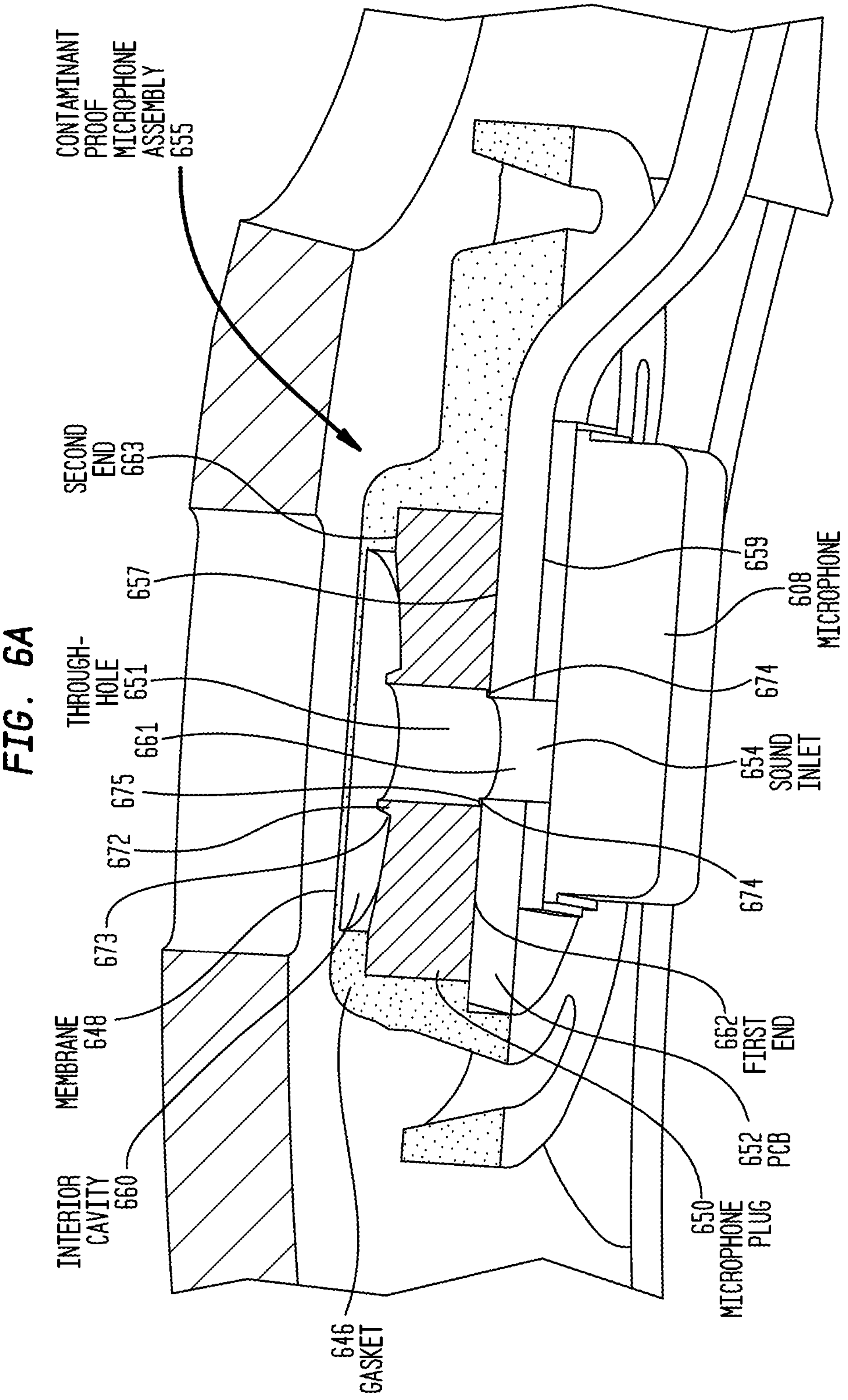
FIG. 6A is a cross-sectional view of a contaminant-proof microphone assembly, in accordance with certain embodiments presented herein.
Figure 6B:
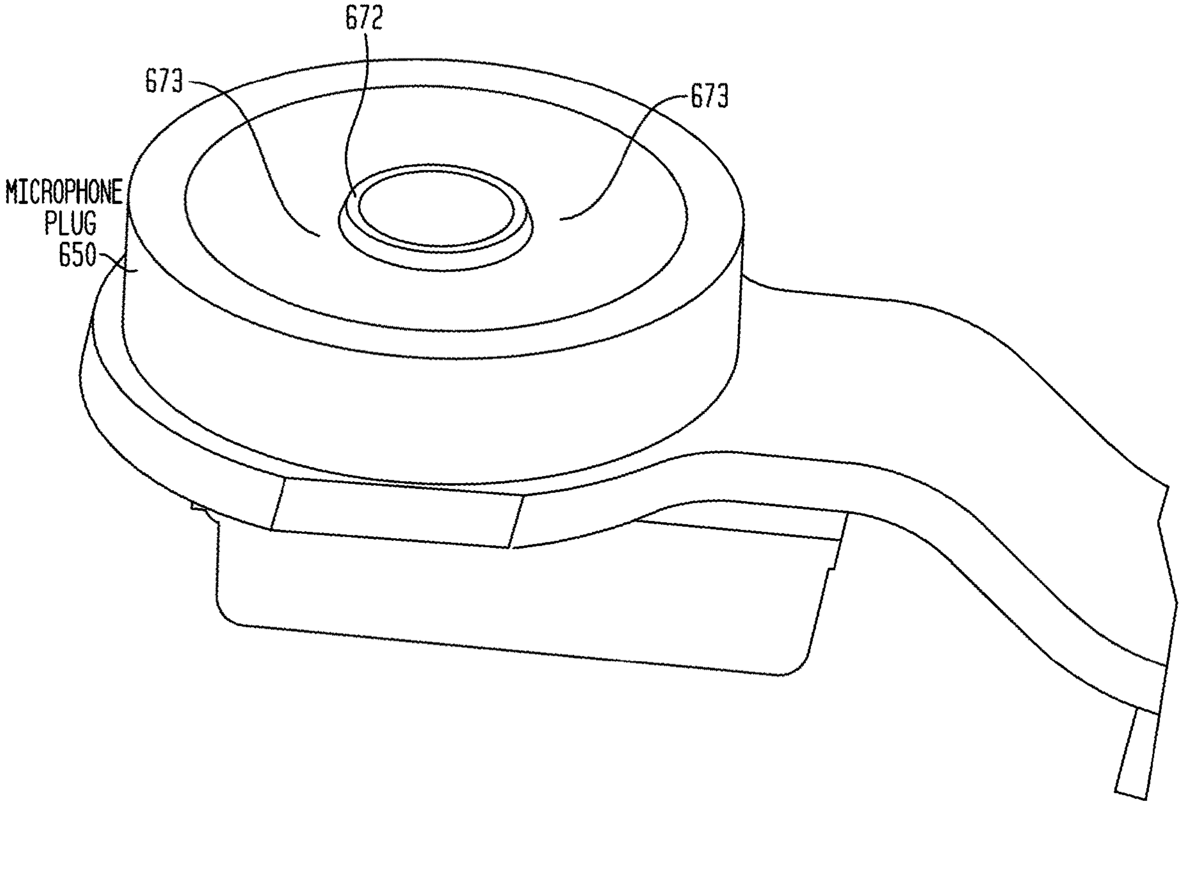
FIG. 6B is a perspective view illustrating further details of the contaminant-proof microphone assembly of FIG. 6A, in accordance with certain embodiments presented herein.

FIGS. 6A and 6B illustrate another embodiment for a contaminant-proof microphone assembly in accordance with certain embodiments presented. More specifically, shown in FIG. 6A is a contaminant-proof microphone assembly 655 that, similar to contaminant-proof microphone assembly 355(A) of FIGS. 3A-3C, comprises a MEMS microphone 608, a microphone plug 650, a gasket 646, and a contaminant-proof membrane ("membrane") 648. FIG. 6B is a perspective view illustrating the microphone plug 650.

In the example of FIGS. 6A and 6B, gasket 646 defines an interior cavity 660. Additionally, the gasket 646 is formed from a resiliently flexible material and is configured to be attached to the internal surface of a housing (not shown in FIGS. 6A and 6B). As shown in FIG. 4, the membrane 648 is disposed between the interior cavity 660 of the gasket 646 and the acoustic port of the housing. The membrane 648 is also acoustically transparent.

As noted, the contaminant-proof microphone assembly 655 includes the microphone plug 650, which comprises a first end 662, a second end 663, and through-hole 651. The through-hole 651 extends from the first end 662 to the second end 663. As shown in FIGS. 6A and 6B, the second end 663 of the microphone plug 650 includes one or more fluid capture/trap features. In this specific example, the fluid capture features include a circumferential ledge 672 extending around the outer edge of the through-hole 651 and a circumferential concavity 673 adjacent to the ledge 672 opposite the through-hole. In other words, FIGS. 6A and 6B illustrate an embodiment in which, if membrane 648 fails (e.g., becomes penetrable by fluids), the second end 663 of the microphone plug 650 is shaped to direct water away from the through-hole 651 and, accordingly, the sound inlet 654 of the microphone 608.

As shown in FIGS. 6A and 6B, the first end 662 of microphone plug 650 is directly mechanically coupled to (e.g., directly attached to) a first surface 657 of the PCB 652. The microphone 608 is directly mechanically coupled to (e.g., directly attached to) a second surface 659 of the PCB 652. Sound inlet 654 is aligned with the through-hole 651 and an opening 661 extending through the PCB 652.

In the example of FIGS. 6A and 6B, the microphone plug 650 is attached to the first surface 657 of the PCB 652 such a portion 674 of the second surface is exposed to the through-hole 651 (e.g., the microphone plug 650 surrounds a portion 674 of the surface 657 of the PCB 652). As a result, if membrane 648 fails, this portion 674 of the PCB surface 657 could be exposed to fluid. In order to prevent damage to the PCB 652, in this example portion 674 includes a waterproof coating 675. In certain examples, the waterproof coating 675 may be a waterproof nano-coating.

In another example, the microphone plug 650 may be shaped/sized so as to fully cover any portions of the first surface 657 of the PCB 652 that could be affected by fluid ingress via the membrane 648. In a still other example, in place of the waterproof coating may, a portion of the microphone plug 650 (e.g., a portion at first end 662) can extend through opening 661 in the PCB 651 to protect the PCB surface from fluid ingress.

Figure 7:
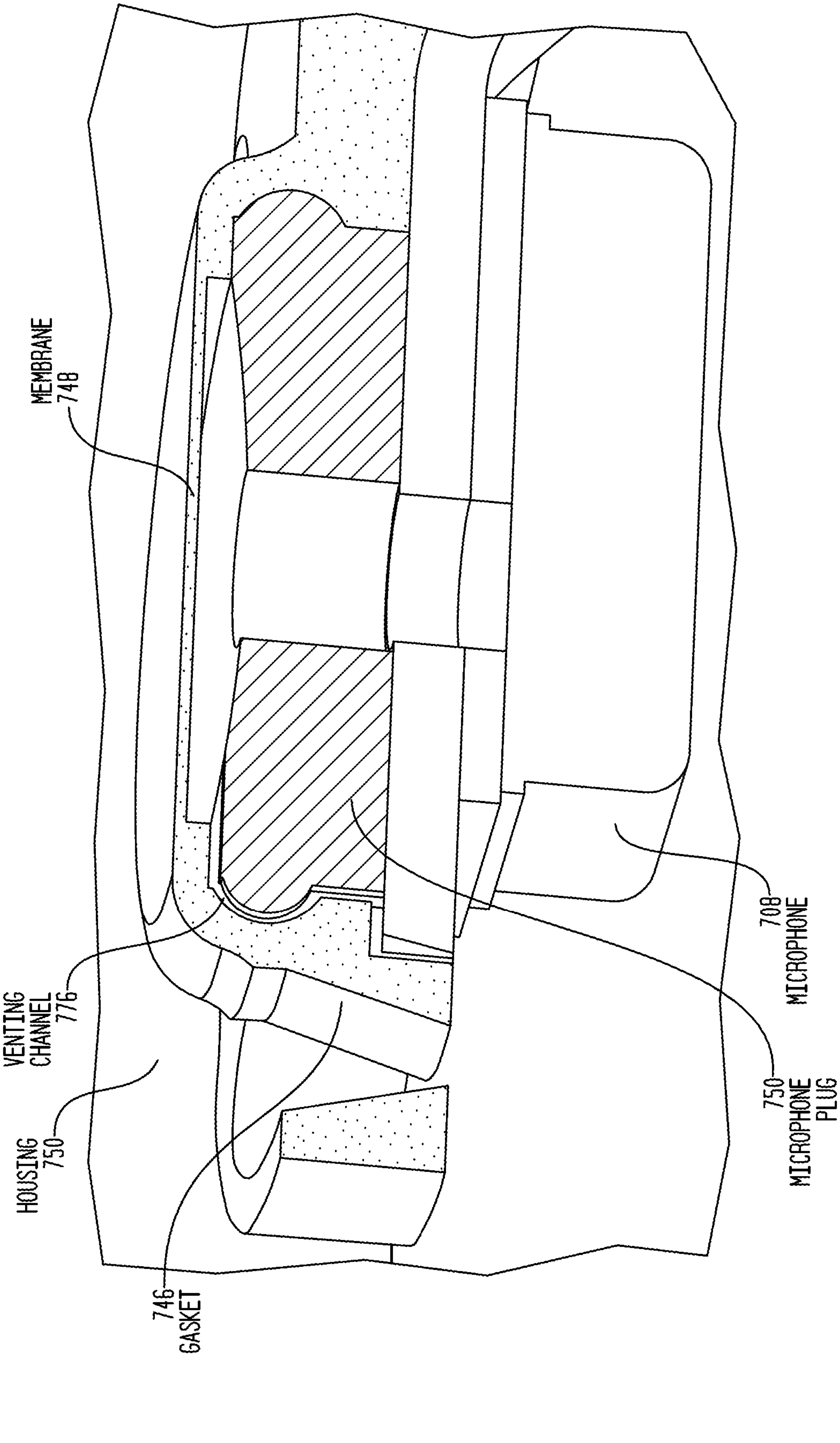
FIG. 7 is a cross-sectional view of a contaminant-proof microphone assembly, in accordance with certain embodiments presented herein.

FIG. 7 illustrates another embodiment for a contaminant-proof microphone assembly in accordance with certain embodiments presented. More specifically, shown in FIG. 7 contaminant-proof microphone assembly 755 that, similar to contaminant-proof microphone assembly 655 of FIGS. 3A-3C, comprises a MEMS microphone 708, a microphone plug 750, a gasket 746, and a contaminant-proof membrane ("membrane") 748.

In the example of FIG. 7, the microphone plug 750 further includes venting channels 776 incorporated therein. The venting channels 776 allow pressure behind the membrane 748 (in the interior cavity) to equalise with the pressure in the rest of the interior of the housing 740.

The embodiments of FIGS. 2A-7 have generally been described above with reference to microphone plugs that include a single cylindrically shaped through-hole. FIG. 8A is a top view of a microphone plug 850(A) have such a cylindrically shaped through-hole 851(A). As shown, the through-hole 851(A) has a circular cross-sectional shape with an outer dimension (d) (e.g., diameter) 878(A).

It is to be appreciated that embodiments having a single cylindrically shaped through-hole are illustrative and that microphone plugs in accordance with embodiments presented herein may have other numbers and shapes of through-holes. For example, FIG. 8B is a top view of one embodiment for a microphone plug, referred to as microphone plug 850(B), that has a single through-hole 851(B) having a rectangular cross-sectional shape. As shown, the through-hole 851(B) has a first outer dimension (d) (e.g., width) 878(B), and a second outer dimension (d2) (e.g., length) 879(B).

Figure 8C:
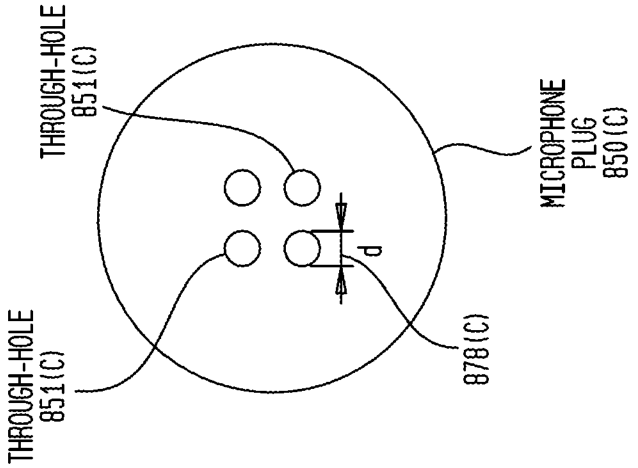
FIG. 8C is a top view of a microphone plug, in accordance with certain embodiments presented herein.
Figure 8B:
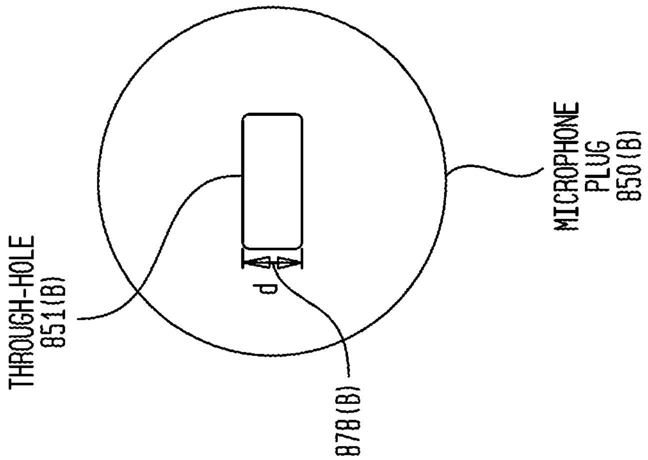
FIG. 8B is a top view of a microphone plug, in accordance with certain embodiments presented herein.
Figure 8A:
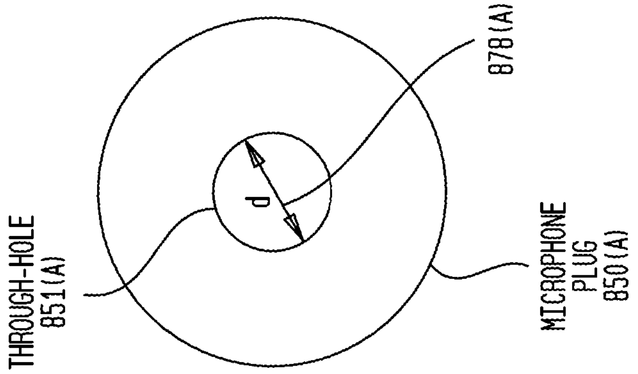
FIG. 8A is a top view of a microphone plug, in accordance with certain embodiments presented herein.

FIG. 8C is a top view of another embodiment for a microphone plug, referred to as microphone plug 850(C), that has a plurality of through-holes 851(C) (e.g., four through-holes). Each of the through-holes 851(C) has a circular cross-sectional shape with an outer dimension (d) (e.g., diameter) 878(C).

Figure 9:
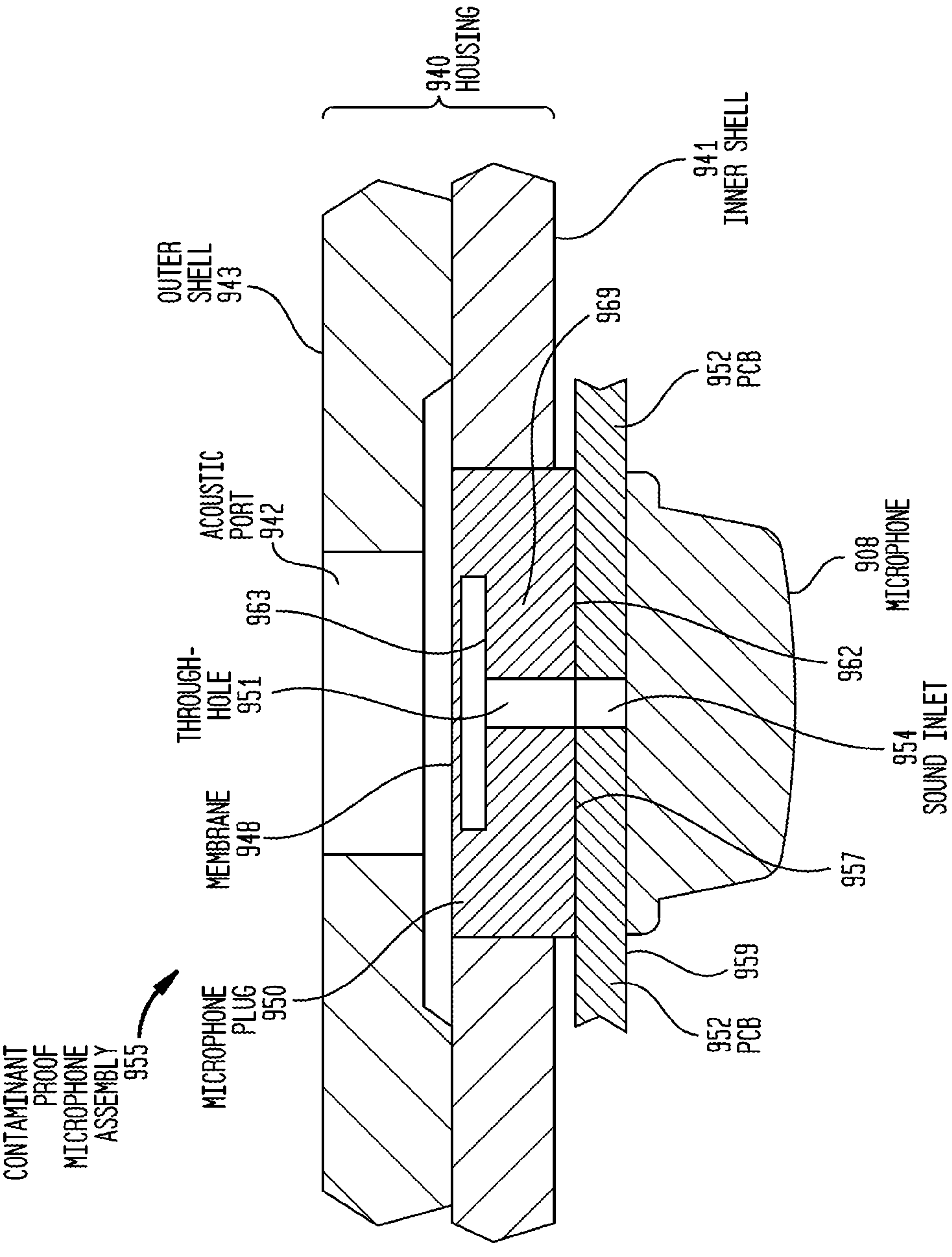
FIG. 9 is a cross-sectional view of a contaminant-proof microphone assembly, in accordance with certain embodiments presented herein.

FIG. 9 illustrates another embodiment for a contaminant-proof microphone assembly 955 in accordance with embodiments herein. In the embodiment of FIG. 9, the contaminant-proof microphone assembly 955 comprises a MEMS microphone 908, a microphone plug 950, and a contaminant-proof membrane ("membrane") 948. In the embodiment of FIG. 9, the microphone plug 950 is configured to directly mate with housing 940 and the membrane 948 is integrated/unitary with the microphone plug 950.

More specifically, as shown the housing 940 is formed by two layers, namely a structural inner shell 941 and a decorative outer shell 943. It is to be appreciated that the use of a two-layer housing is illustrative and that other embodiments may include a single layer housing.

The housing 940 (e.g., inner shell 941 and outer shell 943) includes an acoustic port 942, which allows acoustic sounds to enter the interior of the housing. MEMS microphone 908 is positioned within the housing 940 proximate to the acoustic port 942 so as to detect the acoustic sound signals entering through the acoustic port. The membrane 948, which similar to the above embodiments is acoustically transparent and contaminant-proof, is attached to the microphone plug 950.

As noted, the contaminant-proof microphone assembly 955 comprises the microphone plug 950, which includes a body 969 having a first end 962, a second end 963, and through-hole 951. The through-hole 951 extends from the first end 962 to the second end 963. In addition, the first end 962 is directly mechanically coupled to (e.g., directly attached to) a first surface 957 of a printed circuit board (PCB) 952. The microphone 908 is directly mechanically coupled to (e.g., directly attached to) a second surface 959 of the PCB 952.

In the embodiment of FIG. 9, the microphone plug 950 is coupled to the microphone 908 so as to form an acoustic seal around the sound inlet 954 of the microphone 908 and is configured to be inserted into, and mate with, the housing 940. When the microphone plug 950 is fully inserted into the housing 940, the microphone plug 950 acoustically seals the microphone 908 with the housing 940.

When the microphone plug 950 is fully inserted into the housing 940, the microphone plug 950 is generally/mostly positioned/disposed between the membrane 948 and the sound inlet 954 of the microphone 908. In addition, when the microphone plug 950 is fully inserted into the housing 940, central axis of each of the sound inlet 954 and through-hole 951 are generally aligned with the membrane 948 and the acoustic port 942, and the through-hole 951 acoustically couples the sound inlet 954 of the microphone to the membrane 948. The microphone plug 950 also has an elongate length to space the sound inlet 954 from the membrane 954 and, therefore from the external surface of the housing 940 where sound enters the acoustic port 942. As shown, the sound inlet 954 is aligned with the through-hole 951. In this example, the through-hole 954 has a cross-sectional area that is substantially smaller than a surface area of the membrane 948.

In certain examples, the microphone plug 950 is formed from a resiliently flexible material that is less rigid than the rigid material of the housing 940. In addition, the opening in the housing 940 into which the microphone plug 950 is inserted has an inner dimension (e.g., inside diameter) that is smaller than an outer dimension (e.g., outside diameter) of the microphone plug 950. As such, when the microphone plug 950 is inserted into the housing 940, the microphone plug 950 is configured to be compressed by the sidewalls of the opening in the housing (i.e., the walls surrounding/defining the sides of the opening in the housing 940). In certain embodiments, the compression of the microphone plug 950 is sufficient to retain the microphone plug within the housing 940. However, in further embodiments, the sidewalls surrounding the opening in the housing 940 and the microphone plug 950 may include corresponding interlocking features configured to releasably lock the microphone plug within the acoustic port.

Figure 10:
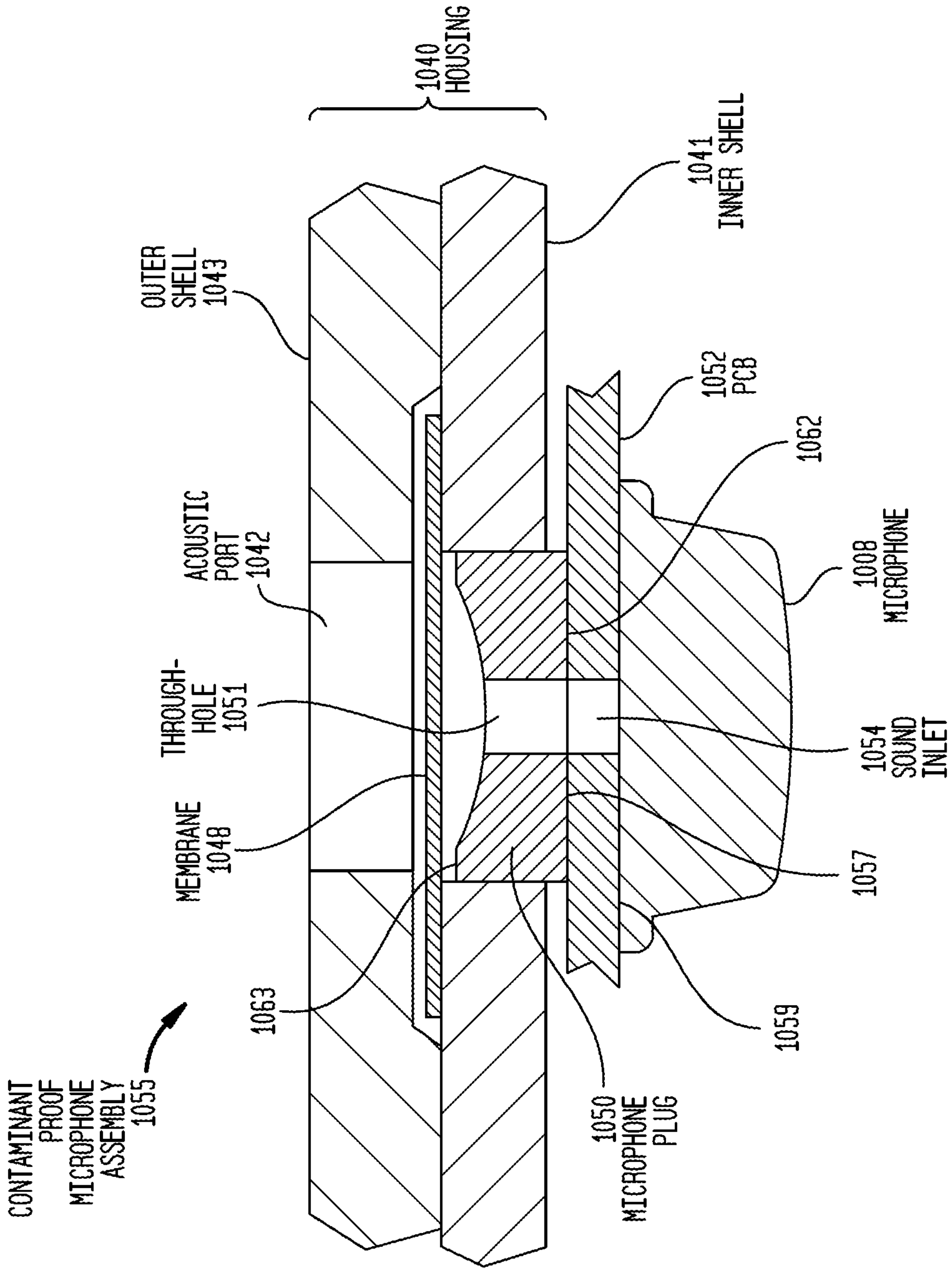
FIG. 10 is a cross-sectional view of a contaminant-proof microphone assembly, in accordance with certain embodiments presented herein.

FIG. 10 illustrates another embodiment for a contaminant-proof microphone assembly 1055 in accordance with embodiments herein. The contaminant-proof microphone assembly 1055 comprises a MEMS microphone 1008, a microphone plug 1050, and a contaminant-proof membrane ("membrane") 1048. In the embodiment of FIG. 10, the microphone plug 1050 is configured to directly mate with housing 1040.

More specifically, as shown the housing 1040 is formed by two layers, namely a structural inner shell 1041 and a decorative outer shell 1043. It is to be appreciated that the use of a two-layer housing is illustrative and that other embodiments may include a single layer housing.

The housing 1040 (e.g., inner shell 1041 and outer shell 1043) includes an acoustic port 1042, which allows acoustic sounds to enter the interior of the housing. MEMS microphone 1008 is positioned within the housing 1040 proximate to the acoustic port 1042 so as to detect the acoustic sound signals entering through the acoustic port. The membrane 1048, which similar to the above embodiments is acoustically transparent and contaminant-proof, is attached to the housing 1040 (e.g., inner shell 1041) and extends across the acoustic port 1042.

As noted, the contaminant-proof microphone assembly 1055 comprises the microphone plug 1050, which includes a first end 1062, a second end 1063, and through-hole 1051. The through-hole 1051 extends from the first end 1062 to the second end 1063. In addition, the first end 1062 is directly mechanically coupled to (e.g., directly attached to) a first surface 1057 of a printed circuit board (PCB) 1052. The microphone 1008 is directly mechanically coupled to (e.g., directly attached to) a second surface 1059 of the PCB 1052.

In the embodiment of FIG. 10, the microphone plug 1050 is coupled to the microphone 1008 so as to form an acoustic seal around the sound inlet 1054 of the microphone 1008 and is configured to be inserted into, and mate with, the acoustic port 1042 of the housing 140. When the microphone plug 1050 is fully inserted into the acoustic port 1042, the microphone plug 1050 acoustically seals the microphone 1008 with the membrane 1048 and the housing 1040. That is, when fully inserted into the acoustic port 1042, the microphone plug 1050 creates a substantially sealed acoustic chamber defined by the membrane 1048, microphone plug 1050 and, potentially, the portion of the housing 1040 surrounding (defining) the acoustic port 1042.

When the second end 1063 of the microphone plug 1050 is fully inserted into the acoustic port 1042, the microphone plug 1050 is generally/mostly positioned/disposed between the membrane 1048 and the sound inlet 1054 of the microphone 1008. In addition, when the second end 1063 is fully inserted into acoustic port 1042, central axis of each of the sound inlet 1054 and through-hole 1051 are generally aligned with the membrane 1048 and the acoustic port 1042, and the through-hole 1051 acoustically couples the sound inlet 1054 of the microphone to the membrane 1048. The microphone plug 1050 also has an elongate length to space the sound inlet 1054 from the membrane 1054 and, therefore from the external surface of the housing 1040 where sound enters the acoustic port 1042. As shown, the sound inlet 1054 is aligned with the through-hole 1051. In this example, the through-hole 1054 has a cross-sectional area that is substantially smaller than a surface area of the membrane 1048.

In certain examples, the microphone plug 1050 is formed from a resiliently flexible material that is less rigid than the rigid material of the housing 1040. In addition, the acoustic port 1042 has an inner dimension (e.g., inside diameter) that is smaller than an outer dimension (e.g., outside diameter) of the microphone plug 1050. As such, when the microphone plug 1050 is inserted into the acoustic port 1042, the microphone plug 1050 is configured to be compressed by the sidewalls of the acoustic port 1042 (i.e., the walls surrounding/defining the sides of the interior acoustic port). In certain embodiments, the compression of the microphone plug 1050 is sufficient to retain the microphone plug within the acoustic port 1042. However, in further embodiments, the sidewalls surrounding the acoustic port 1042 and the microphone plug 1050 may include corresponding interlocking features configured to releasably lock the microphone plug within the acoustic port.

Figure 11:
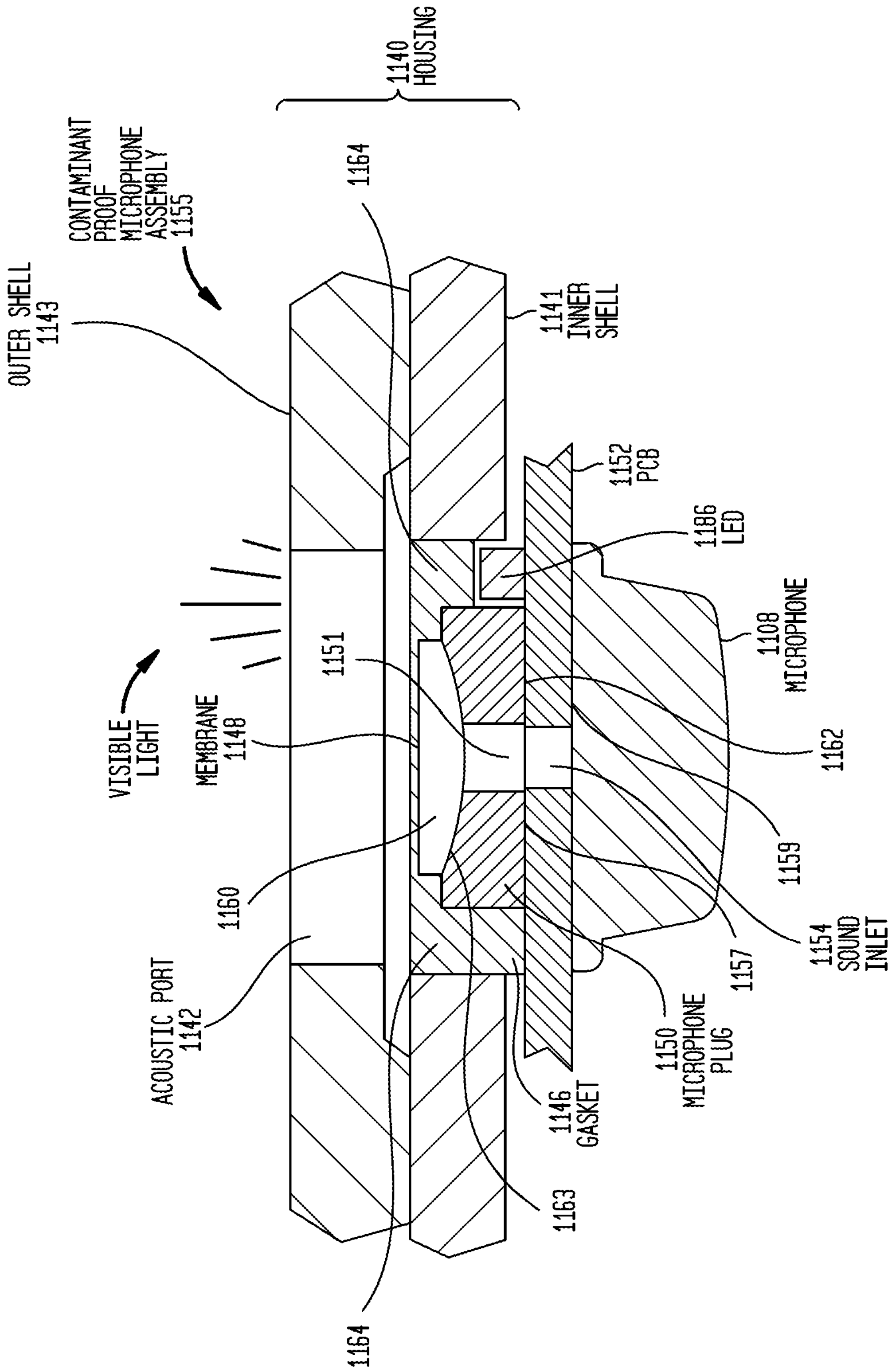
FIG. 11 is a cross-sectional view of a contaminant-proof microphone assembly, in accordance with certain embodiments presented herein.

FIG. 11 illustrates a further embodiment of a contaminant-proof microphone assembly 1155 in accordance with embodiments herein. The contaminant-proof microphone assembly 1155 comprises a MEMS microphone 1108, a microphone plug 1150, a gasket 1146, and a contaminant-proof membrane ("membrane") 1148. In the embodiment of FIG. 11, the contaminant-proof microphone assembly 1155

(e.g., the plug 1150 and/or the gasket 1146) is configured to operate as a light guide to relay light indications to a user.

More specifically, shown is a housing 1140 is formed by two layers, namely a structural inner shell 1141 and a decorative outer shell 1143. It is to be appreciated that the use of a two-layer housing is illustrative and that other embodiments may include a single layer housing.

The housing 1140 (e.g., inner shell 1141 and outer shell 1143) includes an acoustic port 1142, which allows acoustic sounds to enter the interior of the housing. MEMS microphone 1108 is positioned within the housing 1140 proximate to the acoustic port 1142 so as to detect the acoustic sound signals entering through the acoustic port.

As noted, contaminant-proof microphone assembly 1155 includes gasket 1146. The gasket 1146 may have, for example, a cylindrical shape that defines a cylindrical interior cavity 1160 disposed in-line with the acoustic port 1142. Additionally, the gasket 1146 is formed from a resiliently flexible material (e.g., silicone, rubber, etc.) and, as shown in FIG. 11, is attached to internal shell 1141 of the housing 1140. In certain examples, the gasket 1146 may be overmolded onto the housing 1140.

The cylindrical interior cavity 1160 is disposed in-line with the acoustic port 1142 (FIG. 11A). As shown in FIG. 11A, the membrane 1148 is disposed between the interior cavity 1160 of the gasket 1146 and the acoustic port 1142. The membrane 1148 is sometimes referred to herein as being acoustically transparent and contaminant-proof.

The membrane 1148 is connected to the gasket 1146 to form an acoustic chamber with the interior cavity 1160 of the gasket. In the example of FIG. 11, the membrane 1148 is integral/unitary with the gasket 1146 (e.g., the gasket 1146 and the membrane 1148 are formed as a single component). However, it is to be appreciated that, in alternative embodiments, the membrane 1148 and the gasket 1146 may be separate elements that are joined/connected together via, for example, adhesive, ultrasonically welding, etc.

As noted, the contaminant-proof microphone assembly 1155 comprises the microphone plug 1150, which includes a first end 1162, a second end 1163, and through-hole 1151. The through-hole 1151 extends from the first end 1162 to the second end 1163. In addition, the first end 1162 is directly mechanically coupled to (e.g., directly attached to) a first surface 1157 of the PCB 1152. The microphone 1108 is directly mechanically coupled to (e.g., directly attached to) a second surface 1159 of the PCB 1152. In other words, in FIGS. 11A-11C, the microphone plug 1150 is indirectly coupled to the microphone 1108 via PCB 1152 such that the PCB 1152 is located between the microphone plug 1150 and the sound inlet 1154.

In certain embodiments, the microphone 1108 could be soldered to the PCB 1152 (with a hole/opening 1161 in the PCB allowing an acoustic path through the PCB to the sound inlet 1154 of the microphone). The cylindrical plug 1150 may be, for example, soldered, glued, soldered and glued, etc. to the PCB 1152. The microphone plug 1150 and microphone 1108 can then be inserted into the gasket 1146.

As shown in FIG. 11, when the second end 1163 of the microphone plug 1150 is fully inserted into the interior cavity 1160, the microphone plug 1150 is generally/mostly positioned/disposed between the membrane 1148 and the sound inlet 1154 of the microphone 1108. In addition, when the second end 1163 is fully inserted into the interior cavity 1160, central axis of each of the sound inlet 1154 and through-hole 1151 are generally aligned with the membrane 1148 and the acoustic port 1142 and the through-hole 1151 acoustically couples sound inlet 1154 of the microphone to the membrane 1148. The microphone plug 1150 also has an elongate length to space the sound inlet 1154 from the membrane 1148 and, therefore from the external surface of the housing 1140 where sound enters the acoustic port 1142.

In certain examples, the microphone plug 1150 is formed from a material that is relatively more rigid than the resiliently flexible material of the gasket 1146. In addition, the interior cavity 1160 has an inner dimension (e.g., inside diameter) between the sidewalls 1164 that is smaller than an outer dimension (e.g., outside diameter) of the microphone plug 1150. As such, when the microphone plug 1150 is inserted into the interior cavity 1160 of the gasket 1146, the microphone plug 1150 is configured to compress the sidewalls 1164 of the gasket 1146 (i.e., the walls surrounding/defining the sides of the interior cavity 1160). In certain embodiments, the compression of the sidewalls 1164 is sufficient to retain the microphone plug 1150 within the gasket 1146. However, in further embodiments the sidewalls 1164 and the microphone plug 1150 may include corresponding interlocking features configured to releasably lock the microphone plug within the gasket.

As noted above, prior to inserting the microphone plug 1150 into the gasket 1146, the first end of the plug is mechanically coupled to the microphone 1108. This mechanical coupling ensures that an acoustic seal is formed around the microphone 1108. In general, an acoustic seal means that sound from outside the device substantially does not enter between the gasket 1146 and the microphone 1108, nor does sound otherwise enter the main volume of the housing 1140 around the microphone (e.g., the sound inlet 1154 and the microphone 1108 is the only acoustic path for sound.

In the example of FIG. 11, at least one indicator light, such as a light emitting diode (LED) 1186, is positioned/disposed on the PCB 1152 adjacent to at least one of the microphone plug 1150 or the gasket 1146. Additionally, at least one of the microphone plug 1150 or the gasket 1146 is formed from a translucent material such that light emitted from the LED 1186 is visible to a user outside of the housing 1140 via the acoustic port 1142. That is, in the embodiment of FIG. 11, the translucent microphone plug 1150 and/or the translucent gasket 1146 guides the light emitted by LED 1186 out through the acoustic port 1142. This specific embodiment may beneficial by eliminating the need in conventional devices to make separate space available on the surface of the housing 1140 for both LEDs and acoustic ports (i.e., the LEDs and microphone ports can be combined into the same space).

In addition, conventional arrangements generally place the LEDs away from the microphone area, which forces the location of a PCB (or PCB flex) within the sound processing unit to be directly under the light guide. The use of MEMS microphones places the microphone PCB closer to the surface of the processor than has historically been possible (between the microphone and the gasket). Therefore, the microphone PCB can be used to mount the LEDs (instead of giving the LEDs their own dedicated section of PCB) and using a transparent structure between the LED and the housing exterior can give rise to a more space efficient configuration (e.g. essentially co-locating the microphone and the LED).

Figure 12:
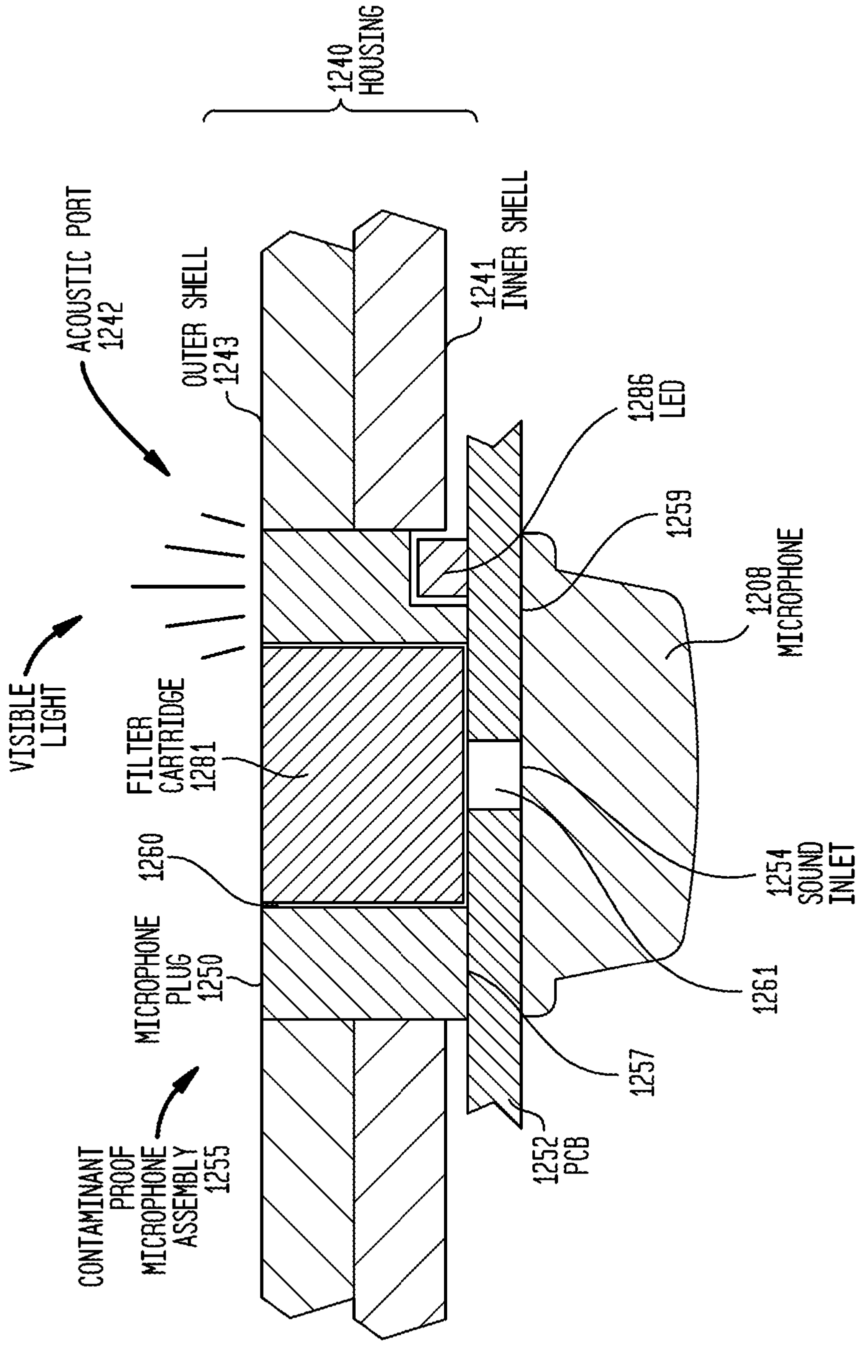
FIG. 12 is a cross-sectional view of a contaminant-proof microphone assembly, in accordance with certain embodiments presented herein.

FIG. 12 illustrates a further embodiment of a contaminant-proof microphone assembly in accordance with embodiments herein. The contaminant-proof microphone assembly 1255 comprises a MEMS microphone 1208, a microphone plug 1250, and a filter cartridge 1281. In the embodiment of FIG. 12, the contaminant-proof microphone assembly 1255 (e.g., the plug 1250) is configured to operate as a light guide to relay light indications to a user.

More specifically, shown is a housing 1240 is formed by two layers, namely a structural inner shell 1241 and a decorative outer shell 1243. It is to be appreciated that the use of a two-layer housing is illustrative and that other embodiments may include a single layer housing.

The housing 1240 (e.g., inner shell 1241 and outer shell 1243) includes an acoustic port 1242, which allows acoustic sounds to enter the interior of the housing. MEMS microphone 1208 is positioned within the housing 1240 proximate to the acoustic port 1242 so as to detect the acoustic sound signals entering through the acoustic port.

In the example of FIG. 12, the microphone 1208 is mounted on a printed circuit board (PCB) 1252 and includes a sound inlet 1254 aligned with the acoustic port 1242. The microphone 1208 is electrically connected to an electrical circuit (not shown in FIG. 12) and is configured to provide the electrical microphone signals to this electrical circuit.

FIG. 12 also illustrates that at least one indicator light, such as a light emitting diode (LED) 1286, is co-located with the microphone 1208. That is, the LED 1286 is also mounted on the PCB 1252 (i.e., both the sub-surface indicator LED 1286 and the microphone 208 are mounted on the same PCB 1252). In the arrangement of FIG. 12, LED 1286 is mounted on a first surface 1257 of the PCB, while the microphone 1208 is mounted on a second surface 1259 of the PCB. However, it is to be appreciated that embodiments presented herein may include other arrangements of the microphone 1208 and LED 1286.

In the example of FIG. 12, the LED 1286 may be a single color or multi-color sub-surface LED. In addition, although FIG. 12 illustrates an example that includes an LED, it is to be appreciated that embodiments presented herein may be implemented with other types of indicator lights.

The LED 1286 is located within the housing 1240. As such, the light emitted by the LED 1286 may not be directly visible from outside the housing 1240, only visible from very small angles, and/or only visible from certain directions. As such, the LED 1286 is optically coupled to the outer surface of outer shell 1243 via microphone plug 1250. That is, the microphone plug 1250 is formed from a translucent material that will illuminate in response to illumination of the sub-surface LED 1286 and/or transport the light emitted by the sub-surface LED 1286 to the outer surface of the housing 1240. As such, the optical properties of the microphone plug 1250 ensure that the light emitted by the LED 1286 will be visible outside of the housing 1240 via the acoustic port 1242.

In addition to optically coupling the LED 1286 to the outer surface of the housing 1240, the microphone plug 1250 also provides mechanical support for the microphone 1208, mechanically isolates the microphone from vibrations delivered to the housing 1240 (e.g., dampens and/or absorbs vibrations), and creates an acoustic seal between the microphone and the housing (e.g., prevents sound signals from passing between the microphone and the housing). The microphone plug 1250 may have, for example, a cylindrical shape that extends circumferentially about the inner surface of the acoustic port 1242 (i.e., gasket lines the inner surface of the acoustic port). Additionally, the microphone plug 1250 is formed from a resiliently flexible material (e.g., silicone, rubber, etc.) and, as shown in FIG. 12, is attached to internal shell 241 of the housing 1240 and the PCB 1252. In certain examples, the microphone plug 1250 may be overmolded onto the housing 1240, attached to the housing via adhesive, etc. Similar or other mechanisms may be used to attach the microphone plug 1250 to the PCB 252.

In this example, the microphone plug 1250 defines a cylindrical cavity 1260 disposed in-line with the acoustic port 1242. Disposed in the cavity 1260 is a filter cartridge 1281. The filter cartridge 1281 covers the sound inlet 1254 of the microphone 1208 and prevents dirt, dust, and other debris from entering the sound inlet. The filter cartridge 1281 is sometimes referred to herein as being acoustically transparent (e.g., penetrable by sound waves/energy without altering frequency response). In certain embodiments, the microphone plug 1250 is configured to compress the filter cartridge 1281 to retain the filter cartridge in the cylindrical cavity 1260. In other embodiments, the filter cartridge 1281 may be directly attached to the outer shell 1243.

Also shown in FIG. 12, the microphone plug 1250 is attached to the first surface 1257 of the PCB 1252. The microphone 1208 is directly mechanically coupled to (e.g., directly attached to) the second surface 1259 of the PCB 1252. In certain embodiments, the microphone 1208 could be soldered to the PCB 1252 (with a hole/opening 1261 in the PCB allowing an acoustic path through the PCB to the sound inlet 1254 of the microphone).

FIG. 12 has been described with reference to a cylindrically shaped microphone plug 1250. However, it is to be appreciated that the microphone plug 1250 may alternatively have any of a number of other shapes (e.g., oval, square, etc.). The microphone plug 1250 may also have any of a number of different colors or configurations that enable light from the sub-surface LED 1286 to reach the outer surface of the outer shell 1243 (e.g., the dye or color of the gasket could cause it to light up a certain color).

Additionally, in alternative embodiments, the microphone plug 1250 may be replaced by a microphone mount that is formed from a rigid or semi-rigid material. In such embodiments, the microphone mount, although shaped similar to the microphone gasket, may be used to retain the microphone 1208 in a desired position, but may provide little or no vibration isolation.

In still other embodiments, the microphone plug 1250 may be formed by a combination of resiliently flexible and rigid materials. For example, the microphone plug 1250 may be largely formed by a resiliently flexible material, but also includes rigid light guides embedded therein to transport light from LED 1286 to the outer surface of housing 1240.

FIG. 12 has also been described with reference to a single LED 1286 positioned adjacent to the microphone plug 1250. It is to be appreciated that, in other embodiments, multiple LEDs may be positioned adjacent to the microphone plug 1250.

Figure 13:
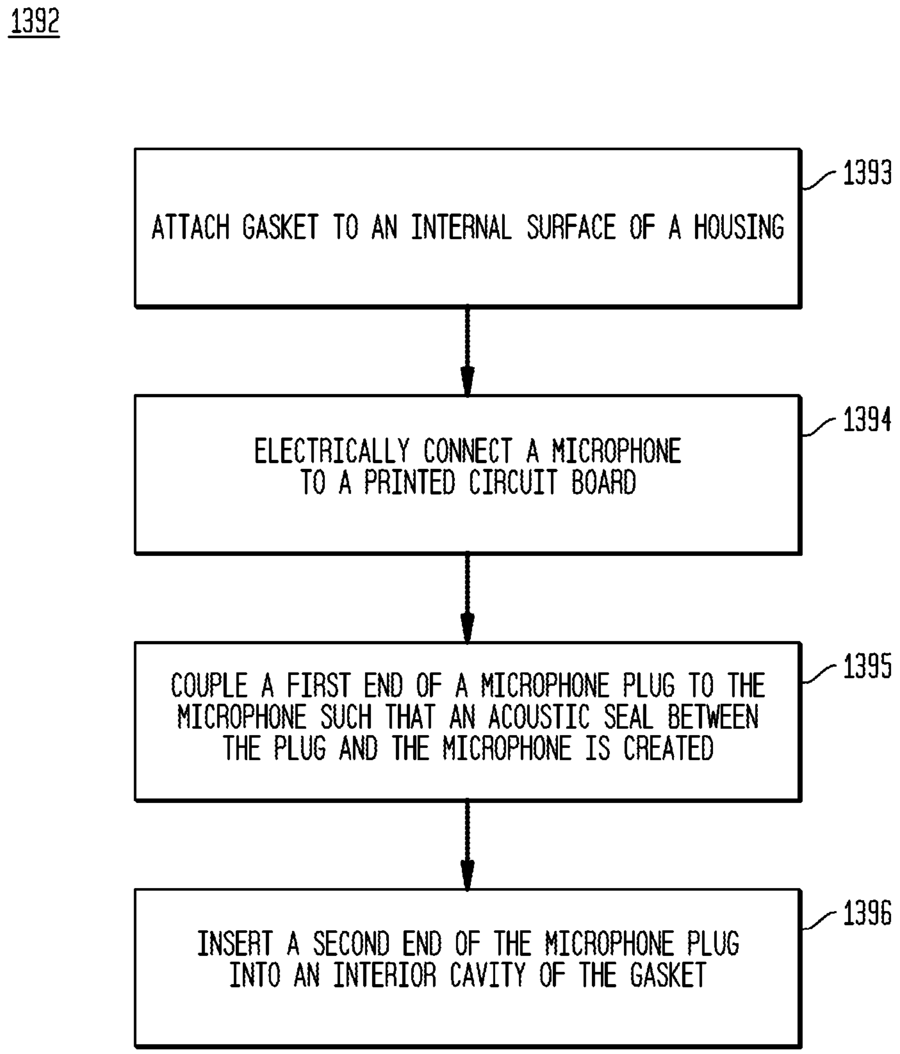
FIG. 13 is a flowchart of a method, in accordance with certain embodiments presented herein.

FIG. 13 is a flowchart of a method 1392 in accordance with certain embodiments presented herein. Method 1392 begins at 1393 where a gasket is attached to an internal surface of a housing (e.g., sound processing unit housing). In certain examples, the gasket may be attached to an internal surface of a housing via overmolding. However, it is also to be appreciated that any of a number of other techniques may be used to attach a gasket to the internal surface of a housing.

Returning to FIG. 13, at 1394 a microphone is electrically connected to a printed circuit board (PCB). In certain embodiments, the microphone is a microelectromechanical systems (MEMS) microphone that is attached to a first surface of the PCB via an automated process such as reflow soldering. In other embodiments, the microphone is a MEMS or other type of microphone that is attached to the PCB via hand soldering. In alternative embodiments, wires could be soldered to the microphone and the PCB to electrically connect the microphone and the PCB.

In the embodiments of FIG. 13, at 1395 a first end of a microphone plug is coupled to the microphone such that an acoustic seal between the plug and the microphone is created. In certain embodiments, the first end of the microphone plug is directly attached to the microphone via, for example, soldering, adhesive, or by some other method. In other example embodiments in which the the microphone is a MEMS microphone attached to a first surface of a PCB, the first end of the plug may be attached to a second surface of the PCB such that the PCB is located substantially between the MEMS microphone and the plug. The first end of the microphone plug may be attached to the PCB via, for example, soldering, adhesive, or by some other method. In these examples in the microphone plug is attached to the PCB, the PCB includes an opening that acoustic couples a sound inlet of the microphone to a through-hole of the microphone plug.

Returning to the example of FIG. 13, at 1396 a second end of the microphone plug is inserted into an interior cavity of the gasket, such that the microphone plug is mostly disposed between a waterproof membrane and the sound inlet of the microphone. In general, the microphone plug is formed from a material that is more rigid than the material used to form the gasket, and the opening in the gasket is slightly smaller than the corresponding surface/s of the plug (e.g., the microphone plug is formed from a material that is more rigid than the material used to form the gasket, and the opening in the gasket is slightly smaller than the corresponding surface/s of the plug). As such, the gasket material deforms slightly to create an acoustic seal between the gasket and the microphone plug.

In certain embodiments, the microphone plug may fixed to the gasket either by an adhesive or by the interlocking of features between the gasket and the plug, PCB or microphone. Alternatively, the microphone plug could be pressed against the gasket by other components within the housing.

Figure 14:
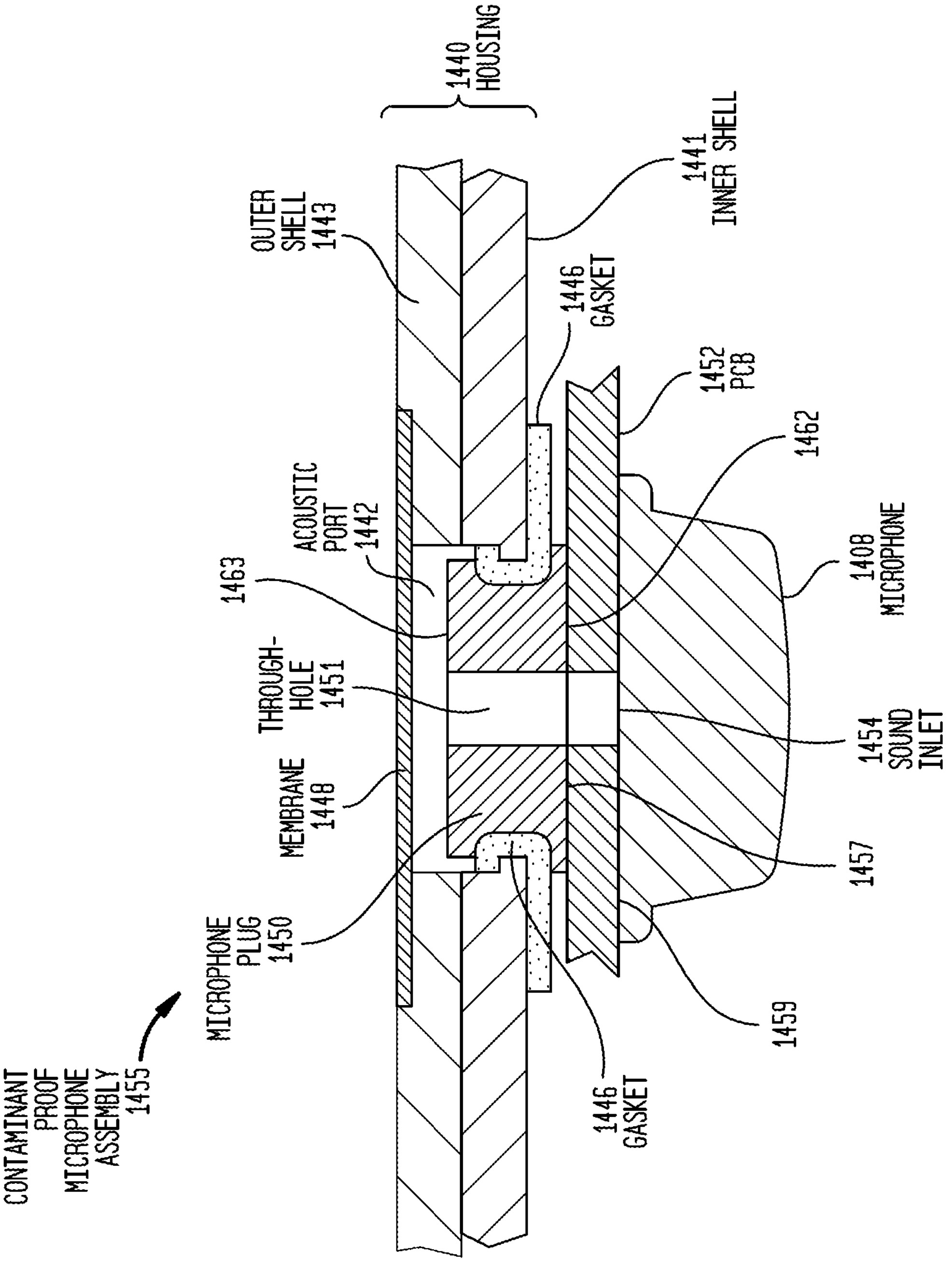
FIG. 14 is a cross-sectional view of a contaminant-proof microphone assembly, in accordance with certain embodiments presented herein.

FIG. 14 illustrates another embodiment for a contaminant-proof microphone assembly 1455 in accordance with embodiments herein. In the embodiment of FIG. 14, the contaminant-proof microphone assembly 1455 comprises a MEMS microphone 1408, a gasket 1446, a microphone plug 1450, and a contaminant-proof membrane ("membrane") 1448.

Also shown in FIG. 14 is a housing 1440 in which the microphone 1408 and the contaminant-proof microphone assembly 1455 are disposed. In this embodiment, the membrane 1448 is attached (e.g., via adhesive, laser welding, etc.) to an outer surface of the housing 1440. The membrane 1448 is formed from an acoustically transparent material.

In the arrangement of FIG. 14, gasket 1446 is attached to the inner surface of the housing 1440 at a second end 1477 of the acoustic port 1442. In particular, the gasket 1446 extends around the inner surface of the second end 1477 of the acoustic port 1442. The gasket 1446 is formed from a resiliently flexible material and may be overmolded onto the inner surface of the housing 1440.

As noted, the contaminant-proof microphone assembly 455 includes the microphone plug 1450, which comprises a first end 1462, a second end 1463, and a through-hole 1451. The through-hole 1451 extends from the first end 1462 to the second end 1463. As shown in FIG. 14, the first end 1462 is directly mechanically coupled to (e.g., directly attached to) a first surface 1457 of a PCB 1452. The microphone 1408 is directly mechanically coupled to (e.g., directly attached to) a second surface 1459 of the PCB 1452. In other words, in FIG. 14, the microphone plug 1450 is indirectly coupled to the microphone 1408 via PCB 1452. Sound inlet 1454 is aligned with the through-hole 1451 and membrane 1448.

As shown in FIG. 14, the second end 1463 of the microphone plug 1450 is configured to be inserted into the acoustic port 1442. When the second end 1463 is fully inserted into the acoustic port 1442, the microphone plug 1450 engages the gasket 1446. In certain examples, the microphone plug 1450 is formed from a material that is relatively more rigid than the resiliently flexible material of the gasket 1446. As such, when the microphone plug 1450 is inserted into the second end 1477 of the acoustic port 1442, the microphone plug 1450 is configured to compress the gasket 1446, which surrounds the inner surface of second end 1477. In certain embodiments, the compression of the gasket 1446 is sufficient to retain the microphone plug 1450 within the acoustic port 1442.

In the embodiment of FIG. 14, the microphone plug 1450 is coupled to the microphone 1408 so as to form an acoustic seal around the sound inlet 1454 of the microphone 1408 and, as noted, is configured to be inserted into, and mate with, the gasket 1446 at the acoustic port 1442. When the microphone plug 1450 is fully inserted into the gasket 1446, the microphone plug 1450 acoustically seals the microphone 1408 with the gasket 1446.

As described above, presented herein are contaminant-proof microphone assemblies in which a component, referred to as a microphone plug, is mechanically coupled (e.g., directly or indirectly) to a microphone configured to be located/disposed inside a housing. The microphone plug acoustically seals a sound inlet of the microphone. The microphone plug, and accordingly the microphone, are physically separate from the housing. However, the microphone plug is configured to mechanically couple the microphone to the housing (e.g., directly or via a gasket) in a contaminant-proof manner.

As noted elsewhere herein, in certain embodiments the contaminant-proof microphone assemblies presented herein allow for the use of a protective membrane over the microphones (e.g., eliminate the use of a gore cartridge), which may reduce total volume occupied by the microphone subassembly. The contaminant-proof microphone assemblies presented herein may also, in certain embodiments, enable the use of MEMS microphones, which are an irregular shape that is difficult to acoustically seal and support, and allow for a simpler assembly process (e.g., MEMS microphones can be reflow soldered to a PCB at the same time as other components, which removes a hand soldering step). The contaminant-proof microphone assemblies presented herein may also allow for a membrane area which is larger than the microphone, which reduces the attenuation of the sound reaching the microphone. The degree of acceptable attenuation is limited by the noise floor of the microphone, therefore if the membrane cannot be made larger a smaller microphone may be used.

It is to be appreciated that the embodiments presented herein are not mutually exclusive and that the various embodiments may be combined with another in any of a number of different manners.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. An apparatus, comprising:

an assembly comprising an acoustic port, an interior cavity, and a through hole;

a contaminant-proof membrane disposed between the interior cavity and the acoustic port; and a microphone comprising a sound inlet and an acoustic membrane, wherein the sound inlet is configured to receive acoustic energy passing through the acoustic port, the contaminant-proof membrane, the interior cavity and the through hole, and wherein a surface area of the acoustic membrane is smaller than a surface area of the contaminant-proof membrane.

2. The apparatus of claim 1, wherein the microphone comprises a microelectromechanical systems (MEMS) microphone.

3. The apparatus of claim 1, wherein the assembly comprises:

a gasket comprising the interior cavity; and a housing comprising the acoustic port.

4. The apparatus of claim 3, wherein the contaminant-proof membrane and the gasket are formed as a unitary component.

5. The apparatus of claim 1, wherein the assembly further comprises a microphone plug comprising the through hole, a first end coupled to the microphone, and a second end located within the interior cavity.

6. The apparatus of claim 5, wherein the first end of the microphone plug is directly attached to the microphone.

7. The apparatus of claim 1, further comprising a printed circuit board, wherein the microphone is attached to a surface of the printed circuit board, and the printed circuit board comprises an orifice connecting the through hole to the sound inlet.

8. The apparatus of claim 7, further comprising a light-emitting diode arranged on the printed circuit board.

9. The apparatus of claim 1, further comprising a mesh arranged within the assembly and configured to limit deformation of the contaminant-proof membrane in response to external pressure.

10. An apparatus, comprising:

an assembly comprising an acoustic port, an interior cavity, and a through hole;

a contaminant-proof membrane disposed between the interior cavity and the acoustic port; and a microphone comprising a sound inlet and an acoustic membrane;

wherein the sound inlet is configured to receive acoustic energy passing through the acoustic port, the contaminant-proof membrane, the interior cavity and the through hole, and wherein a cross-sectional area of the through hole is smaller than a surface area of the contaminant-proof membrane.

11. The apparatus of claim 10, wherein a surface area of the acoustic membrane is smaller than the surface area of the contaminant-proof membrane.

12. The apparatus of claim 10, wherein the microphone comprises a microelectromechanical systems (MEMS) microphone.

13. The apparatus of claim 10, wherein the assembly comprises:

a gasket comprising the interior cavity; and a housing comprising the acoustic port.

14. The apparatus of claim 13, wherein the contaminant-proof membrane and the gasket are formed as a unitary component.

15. The apparatus of claim 10, wherein the assembly further comprises a microphone plug comprising the through hole, a first end coupled to the microphone, and a second end located within the interior cavity.

16. The apparatus of claim 10, further comprising a printed circuit board arranged between the microphone and the assembly, wherein the microphone is attached to a surface of the printed circuit board, and the printed circuit board comprises an orifice connecting the through hole to the sound inlet.

17. An apparatus, comprising:

an assembly comprising an acoustic port, an interior cavity, and a plurality of through holes;

a contaminant-proof membrane disposed between the interior cavity and the acoustic port; and a microphone comprising a sound inlet and an acoustic membrane, wherein the sound inlet is configured to receive acoustic energy passing through the acoustic port, the contaminant-proof membrane, the interior cavity and the plurality of through holes, and wherein a surface area of the acoustic membrane is smaller than a surface area of the contaminant-proof membrane.

18. The apparatus of claim 17, wherein the microphone comprises a microelectromechanical systems (MEMS) microphone.

19. The apparatus of claim 17, wherein the assembly comprises:

a gasket comprising the interior cavity; and a housing comprising the acoustic port.

20. The apparatus of claim 17, wherein the assembly further comprises a microphone plug comprising the plurality of through holes, a first end coupled to the microphone, and a second end located within the interior cavity.

* * * * *